Nov. 6, 1951 C. J. BAMFORD, SR 2,574,163
MECHANISM FOR FABRICATING BUILDING SECTIONS
Filed July 3, 1945 18 Sheets-Sheet 1
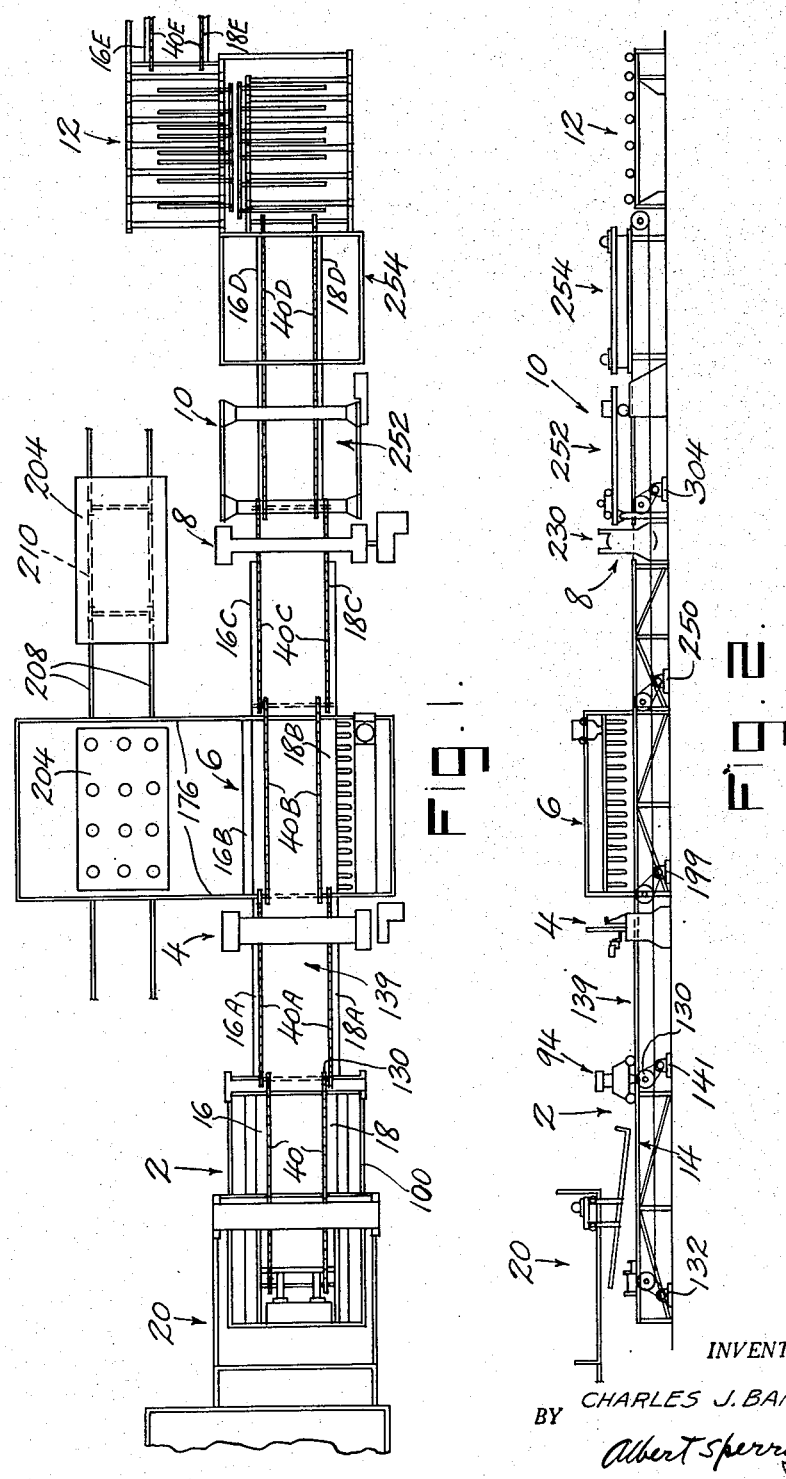
INVENTOR.
CHARLES J. BAMFORD, SR.
BY Albert Sperry
ATTORNEY Nov. 6, 1951          C. J. BAMFORD, SR          2,574,163
MECHANISM FOR FABRICATING BUILDING SECTIONS
Filed July 3, 1945          18 Sheets-Sheet 2
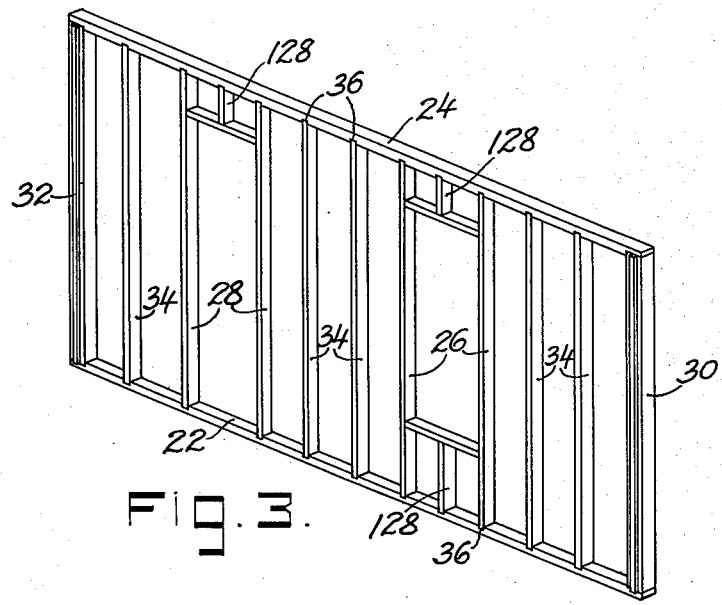
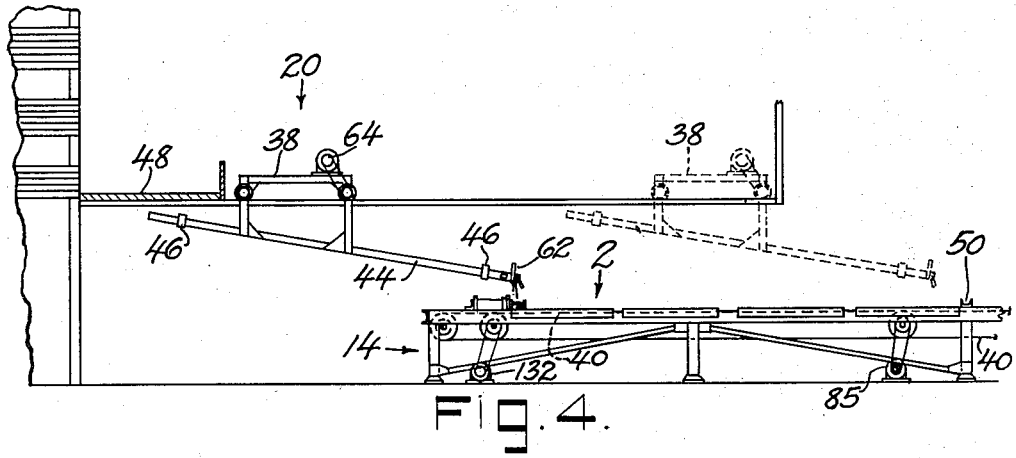
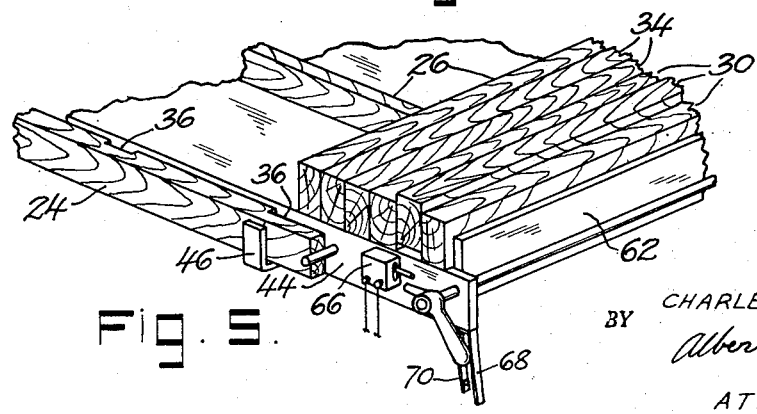
INVENTOR.
CHARLES J. BAMFORD, SR.
BY Albert Sperry
ATTORNEY

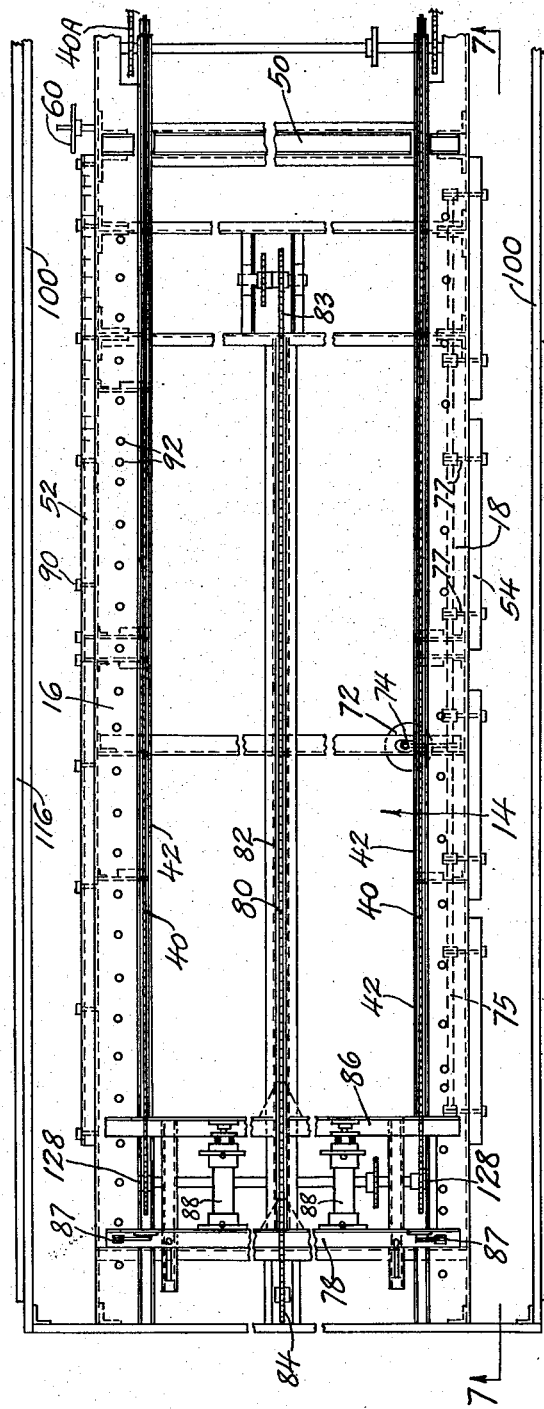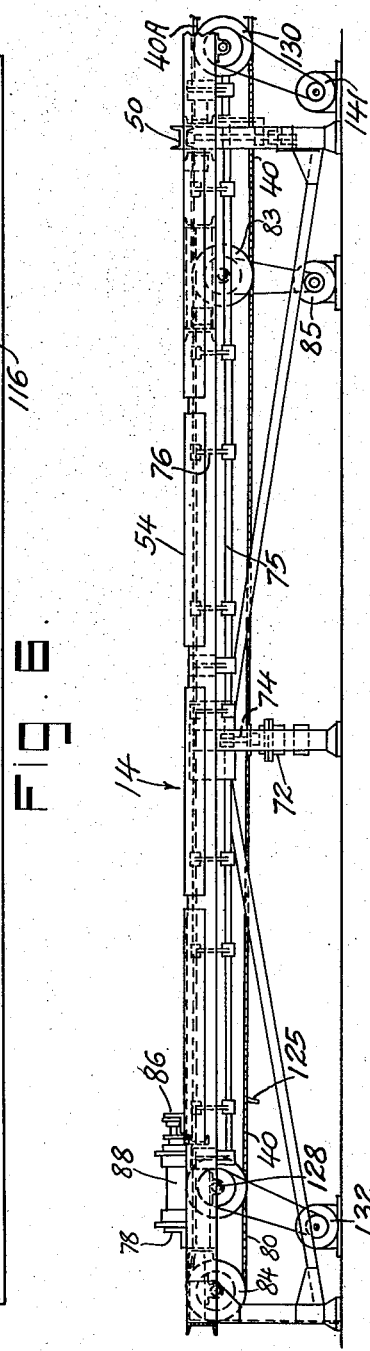

Nov. 6, 1951  C. J. BAMFORD, SR  2,574,163
MECHANISM FOR FABRICATING BUILDING SECTIONS
Filed July 3, 1945  18 Sheets-Sheet 4

INVENTOR.
CHARLES J. BAMFORD, SR.
BY Albert Sperry
ATTORNEY

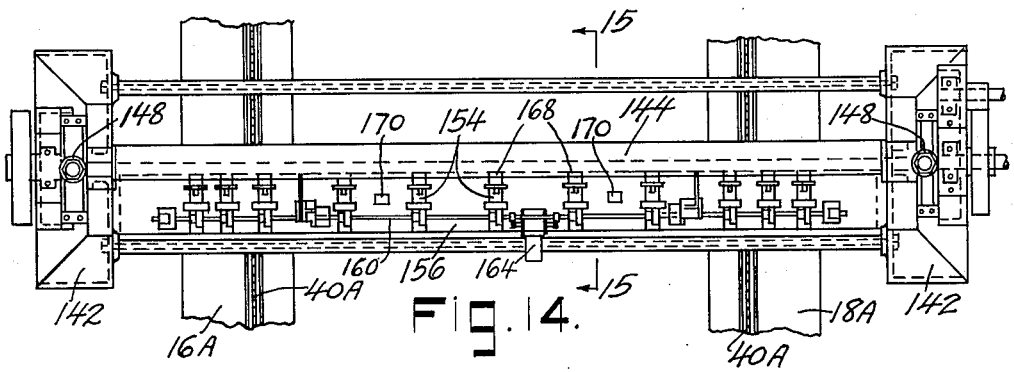
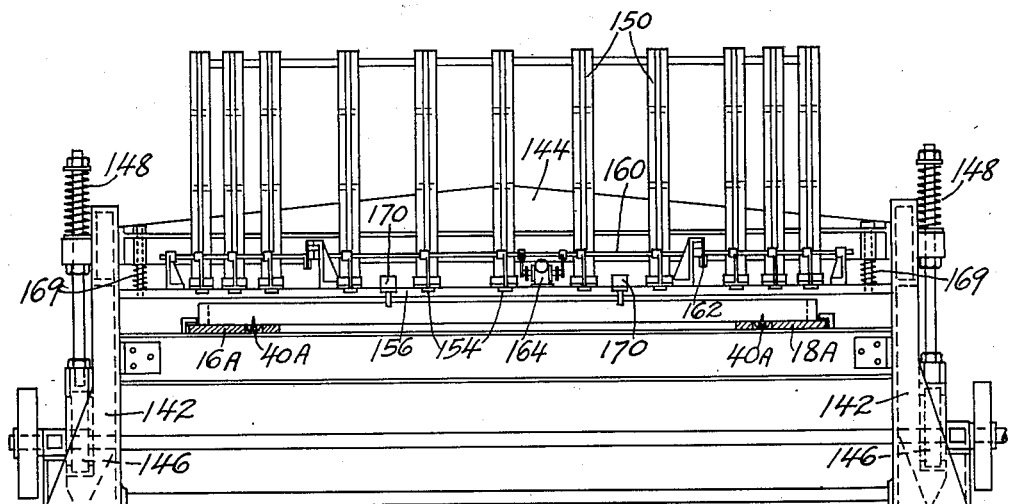
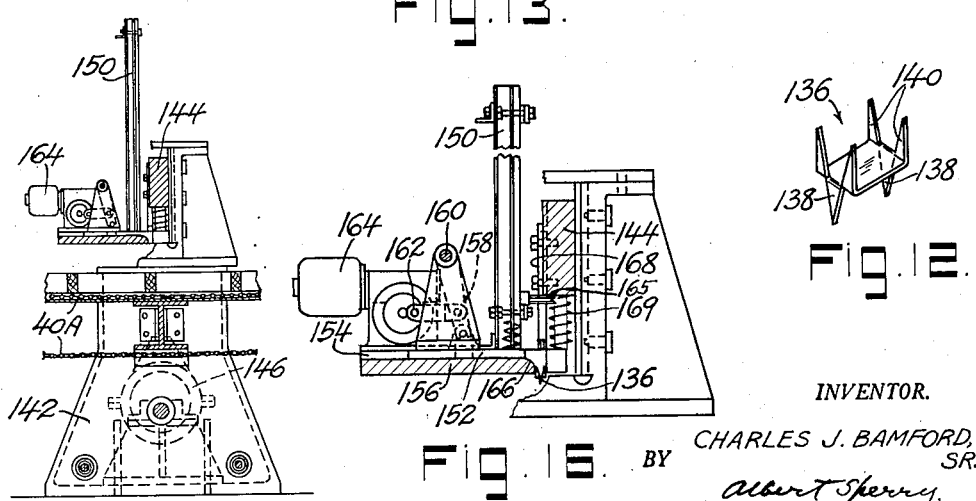

Nov. 6, 1951 C. J. BAMFORD, SR 2,574,163
MECHANISM FOR FABRICATING BUILDING SECTIONS
Filed July 3, 1945 18 Sheets-Sheet 7

INVENTOR.
CHARLES J. BAMFORD, SR.
BY Albert Sperry
ATTORNEY

Nov. 6, 1951  C. J. BAMFORD, SR  2,574,163
MECHANISM FOR FABRICATING BUILDING SECTIONS
Filed July 3, 1945  18 Sheets-Sheet 8

INVENTOR.
CHARLES J. BAMFORD, SR.
BY Albert Sperry
ATTORNEY

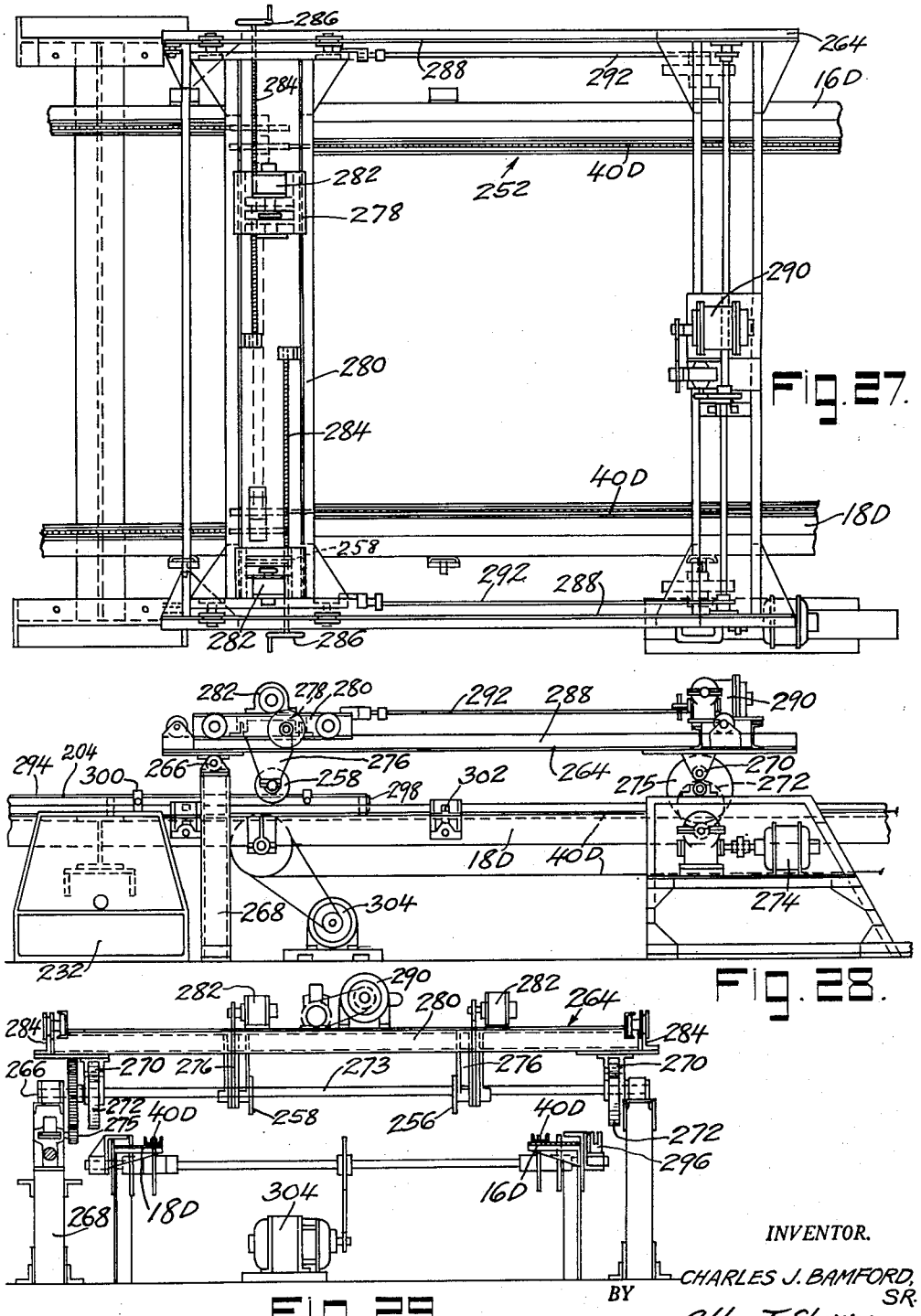

Nov. 6, 1951     C. J. BAMFORD, SR     2,574,163
MECHANISM FOR FABRICATING BUILDING SECTIONS

Filed July 3, 1945     18 Sheets-Sheet 10

INVENTOR.
CHARLES J. BAMFORD, SR.
BY Albert Sperry
ATTORNEY

Nov. 6, 1951     C. J. BAMFORD, SR     2,574,163
MECHANISM FOR FABRICATING BUILDING SECTIONS
Filed July 3, 1945     18 Sheets-Sheet 11

INVENTOR.
BY CHARLES J. BAMFORD, SR.
Albert Sperry.
ATTORNEY

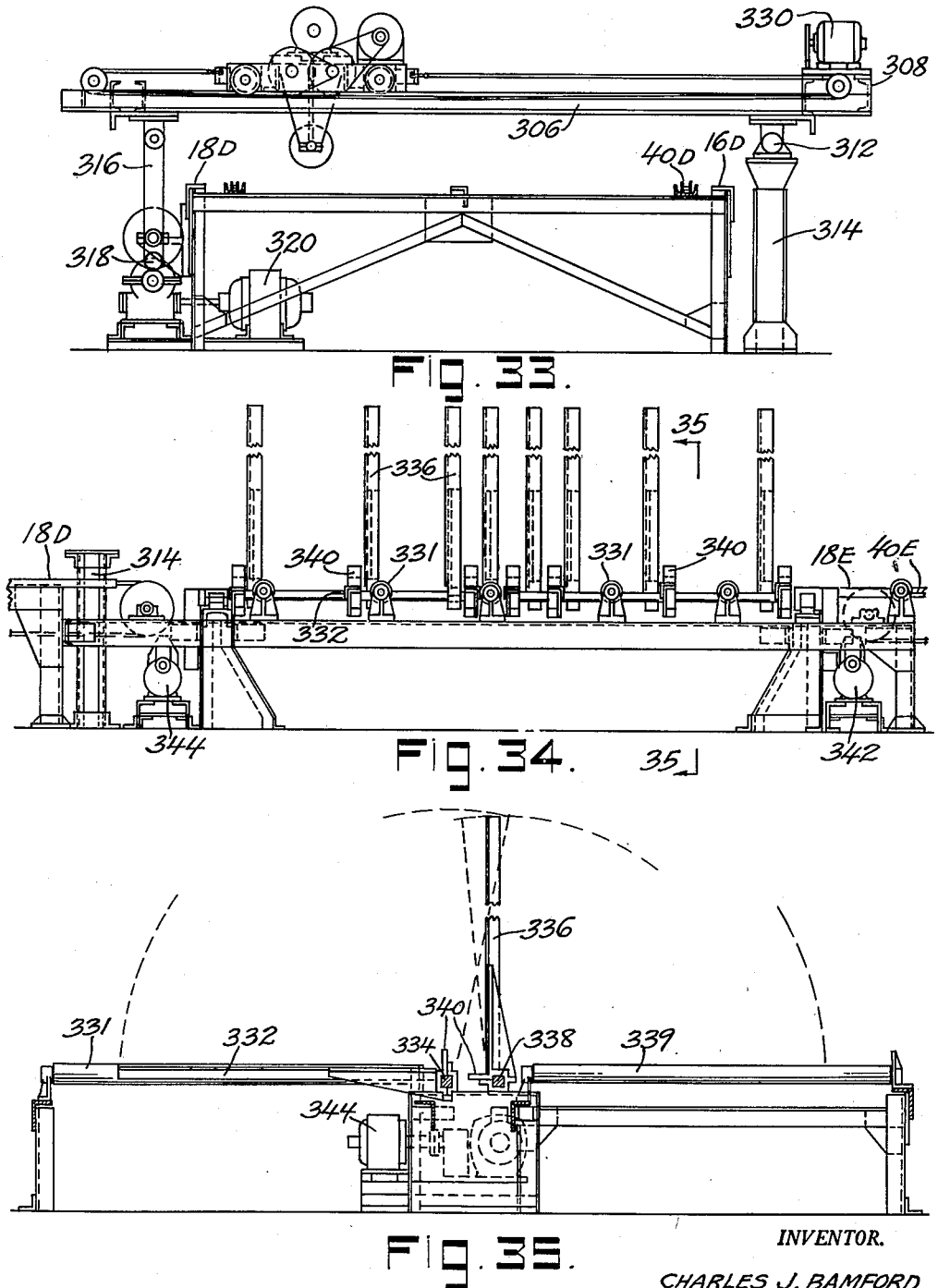

Nov. 6, 1951  C. J. BAMFORD, SR  2,574,163
MECHANISM FOR FABRICATING BUILDING SECTIONS
Filed July 3, 1945  18 Sheets-Sheet 13

INVENTOR.
CHARLES J. BAMFORD, SR.
BY Albert Sperry
ATTORNEY

Nov. 6, 1951     C. J. BAMFORD, SR     2,574,163
MECHANISM FOR FABRICATING BUILDING SECTIONS
Filed July 3, 1945     18 Sheets-Sheet 14
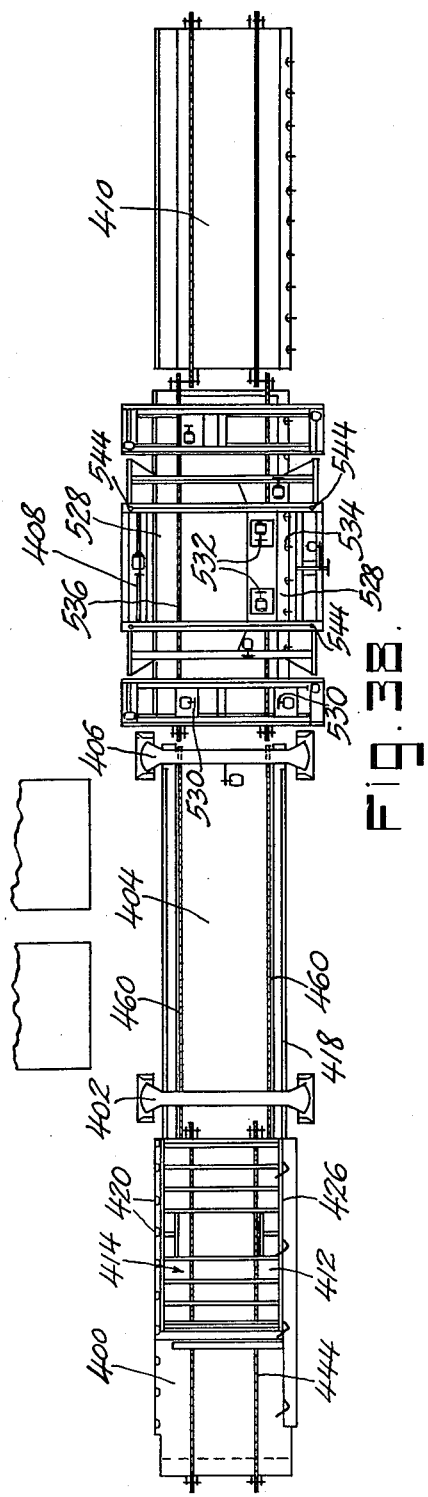
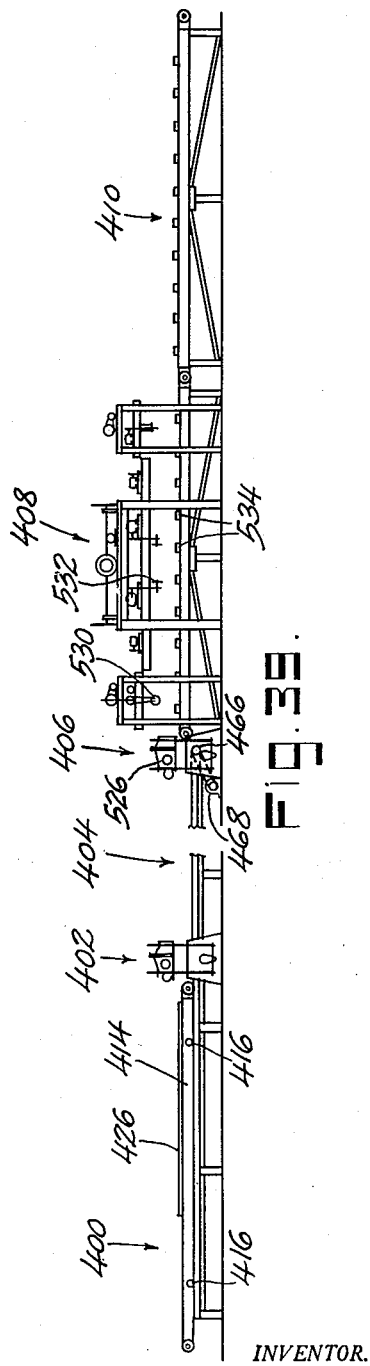
INVENTOR.
BY CHARLES J. BAMFORD, SR.
ATTORNEY

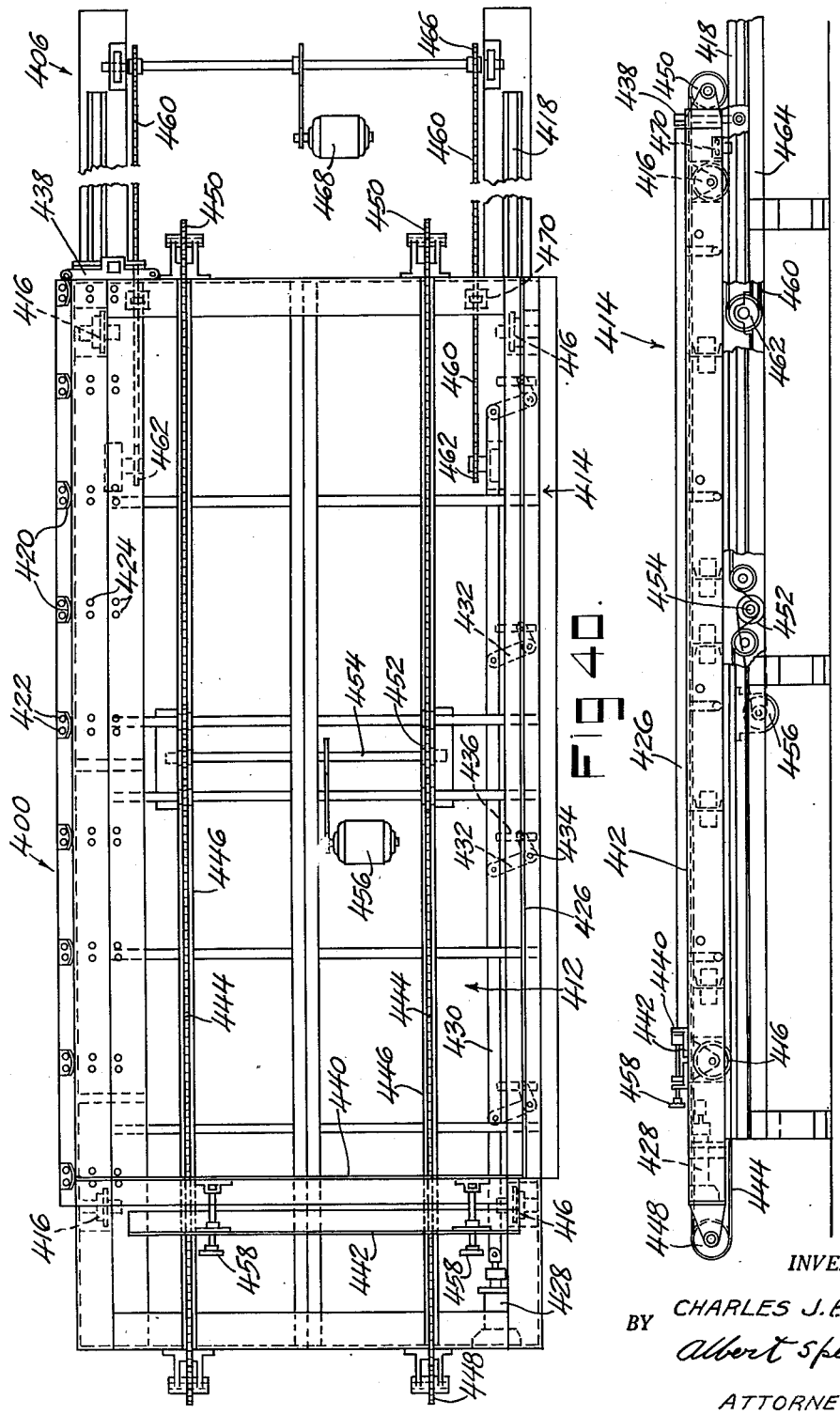

Nov. 6, 1951     C. J. BAMFORD, SR     2,574,163
MECHANISM FOR FABRICATING BUILDING SECTIONS
Filed July 3, 1945     18 Sheets-Sheet 16

INVENTOR.
CHARLES J. BAMFORD, SR.
BY Albert Sperry
ATTORNEY

Nov. 6, 1951     C. J. BAMFORD, SR     2,574,163
MECHANISM FOR FABRICATING BUILDING SECTIONS

Filed July 3, 1945     18 Sheets-Sheet 17

INVENTOR.
BY CHARLES J. BAMFORD, SR.
Albert Sperry
ATTORNEY

Nov. 6, 1951     C. J. BAMFORD, SR     2,574,163
MECHANISM FOR FABRICATING BUILDING SECTIONS
Filed July 3, 1945     18 Sheets-Sheet 18

INVENTOR.
BY CHARLES J. BAMFORD, SR.
Albert Sperry
ATTORNEY

Patented Nov. 6, 1951

2,574,163

UNITED STATES PATENT OFFICE 2,574,163

MECHANISM FOR FABRICATING BUILDING SECTIONS

Charles J. Bamford, Sr., Trenton, N. J., assignor to Homasote Company, Incorporated, Fernwood, N. J., a corporation of New Jersey Application July 3, 1945, Serial No. 602,982

13 Claims. (Cl. 144—309)

1

My invention relates to machines and methods for fabricating structural members and assemblies, and relates particularly to the manufacture of constructions such as wall sections, floor sections, ceiling sections, and other structures for use in the erection of prefabricated buildings.

Heretofore in the construction of buildings and in the manufacture of prefabricated building sections, it has been necessary to employ a great deal of manual labor in the assembling, nailing and other operations required to construct the building sections. Moreover, many of these operations are repeated over and over again and as a result even the most skillful workmen tend to become careless so that the sections are not always accurately constructed. No machine has ever been developed heretofore which is capable of use in fabricating building sections or similar structural elements.

In accordance with the present invention, timbers or other members to be used in fabricating building sections or other constructions are assembled, and the operations of nailing or securing the timbers or structural elements together is performed automatically and with a degree of accuracy and certainty which cannot be attained in manual operation. Further, in accordance with my invention wallboard, flooring, siding or other covering material is applied to the framework first produced, and door openings, window openings, and the like may be formed in the section so as to produce a building section ready for use directly in the erection of a building. Moreover, each of the operations is coordinated and carried out by novel mechanical means which serve to enable building sections or the like to be produced rapidly and automatically with a minimum of labor.

One of the objects of my invention is to provide novel methods for fabricating building sections and similar structural elements.

Another object of my invention is to provide novel methods for constructing sections of prefabricated buildings.

A further object of my invention is to provide novel machinery adapted for use in the manufacture of building sections and similar structures.

These and other objects and features of my invention will appear from the following description thereof in which reference is made to the figures of the accompanying drawings.

In the drawings:

Fig. 1 is a diagrammatic plan view of a typical machine embodying my invention.

2

Fig. 2 is a diagrammatic side elevation of the construction illustrated in Fig. 1.

Fig. 3 is a perspective of a typical wall section produced by the machine illustrated in Figs. 1 and 2.

Fig. 4 is an enlarged side elevation of a typical loader for depositing timbers on the assembly table of the construction shown in Figs. 1 and 2.

Fig. 5 is a perspective of a portion of the loader illustrated in Fig. 4.

Fig. 6 is a top plan view of the assembly table.

Fig. 7 is a side elevation of the assembly table shown in Fig. 6.

Fig. 12 is a perspective of a typical fastening element used in the practice of my invention.

Fig. 13 is a vertical sectional view of a preferred form of mechanism for applying fastening elements of the type shown in Fig. 12 to the timbers of a framework.

Fig. 14 is a top plan view of the fastener applying device of Fig. 13.

Fig. 15 is a vertical sectional view of the fastener applying device of Figs. 13 and 14, taken on the line 15—15 of Fig. 14.

Fig. 16 is an enlarged view of a detail of the fastener applying device of Figs. 13, 14 and 15.

Fig. 27 is a top plan view of mechanism for forming longitudinally extending cuts in the wallboard or sheet material in the device illustrated in Figs. 1 and 2.

Fig. 28 is a side elevation of the mechanism illustrated in Fig. 27.

Fig. 29 is a vertical sectional view through the machine illustrated in Figs. 1 and 2 showing the mechanism of Figs. 27 and 28 in end elevation.

Fig. 33 is a vertical sectional view through the machine of Figs. 1 and 2 showing the mechanism of Figs. 31 and 32 in elevation.

Fig. 34 is a side elevation of mechanism for inverting sections produced on the machine of Figs. 1 and 2.

Fig. 35 is a vertical sectional view of the constructions illustrated in Fig. 34 taken on the line 35—35 thereof.

Fig. 38 is a diagrammatic top plan view of an alternative construction embodying my invention.

Fig. 39 is a diagrammatic side elevation of the construction illustrated in Fig. 38.

Fig. 40 is a plan view of the assembly table and carriage of the device illustrated in Figs. 38 and 39.

Fig. 41 is a side elevation of the construction illustrated in Fig. 40.

Figure 11:
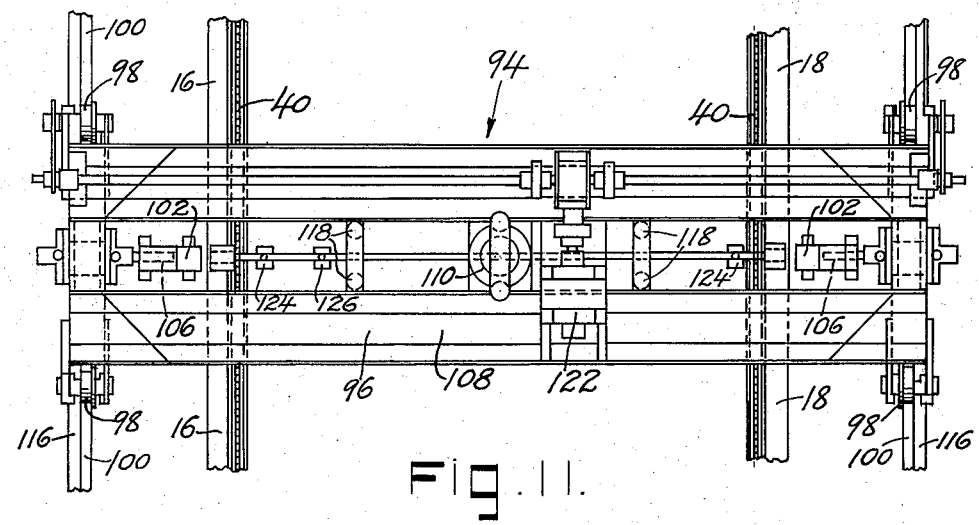
Fig. 11 is a top plan view of the nailing device.

In accordance with my invention the operations by which structural elements, prefabricated building sections or the like are produced are carried out successively and automatically in a series of steps and at successive stations in a machine. The timbers, or other pieces or assemblies, which are used in making up the sections are arranged, secured and finished in coordinated operations and in timed relation so that completed building sections or other structures may be rapidly produced in a continuous operation. However, in fabricating many types of building sections and in making other structures the order in which the operations are carried out and the arrangement and form of the mechanism used may be varied and in some instances one or more of the operations may be duplicated or omitted to produce a desired result. Therefore, the particular machines and the particular order and arrangement of the stations and mechanism illustrated in the drawings and hereinafter described are intended to be illustrative only.

In accordance with that embodiment of my invention illustrated in Figs. 1 to 37 the machine is designed primarily for use in making sections of prefabricated buildings. The general arrangement of typical stations and mechanism used for this purpose is illustrated in Figs. 1 and 2 wherein the timbers or elements forming the framework of the section are assembled and secured together at the assembly station 2 and are passed from left to right through each station in turn. The framework produced at station 2 therefore is passed to the station 4 where fastening elements for securing wallboard, sheet material, insulation or siding are applied to the framework. Thereafter glue is applied to the framework at the station 6 and wall board is applied over the glue and fastening elements while the section remains at station 6. The section then moves on to the pressing station 8 where the wall board is forced into contact with the fastening elements and glue so that it is firmly secured to the framework. The assembly then is passed on to station 10 where the wall board is cut or finished to provide door or window openings, electrical or plumbing outlets and the like.

When the section is provided with wall board or sheet material on one face only the section is then completed and ready to be transported to the building site for assembly and erection with other building sections. However, sheet material may be applied to both faces of the section and in that event the section leaving the cutting station 10 passes on to a turn over station 12 where the section is turned over and started on through other stations similar to stations 4, 6, 8 and 10 to apply sheet material to the opposite face of the framework and finish the other face of the section.

The framework of the section is advanced from station to station by means of suitable conveying means. For convenience and simplicity of operation, separate conveyors may be provided for each station or for a group of stations so that they may be driven by separate motors or other power means. This permits movement of the timbers or sections through or past any particular station at a predetermined speed independently of the speed of movement of the section through other stations. It also renders it possible to produce successive sections of different length by moving one conveyor for a longer period of time or at a different speed than another. At the same time the operations at the other stations may proceed as desired and it is possible to position and move a section within the limits of a station to perform successive operations on the section at selected points thereon.

When forming a wall section for a prefabricated building, such as the section shown in Fig.

3, the assembly station 2 is in the form of a table 14 having longitudinally extending supports 16 and 18 to which timbers are supplied by a loader 20. The timbers are pre-cut to size and shape and usually include sub-assemblies made up of previously fabricated door and window sub-assemblies as well as intersection or end sub-assemblies. Thus the timbers used in forming the framework of the wall section shown in Fig. 3 include a bottom plate 22, a top plate 24, a window sub-assembly 26, a door sub-assembly 28, end intersection sub-assemblies 30 and 32, and studs 34. The bottom and top plates 22 and 24 are cut to predetermined lengths equal to the length of the section to be constructed and preferably are routed out or notched as shown at 36 to receive and position the ends of the timbers which form the vertically extending members of the section frame.

These timbers and sub-assemblies are cut or made up and held in stock so that they may be selected readily and assembled on the loader 20 in a predetermined order corresponding to the plan of the wall section to be produced. The loader 20 is mounted on a carriage 38 and movable back and forth above the supports 16 and 18 on the assembly table shown in Figs. 4, 6, 7 and 8, and above the conveyors 40 which travel in longitudinal extending channels 42 extending parallel with but below the supports 16 and 18. An inclined support 44 on the carriage 38 receives and holds the timbers which form the vertically extending members of the sections, while the top and bottom plates 22 and 24 are supplied to the supports 46 on opposite sides of the inclined support 44. The timbers are placed on the supports 44 and 46 in the proper order and positions by an operator standing on the platform 48.

Figure 8:
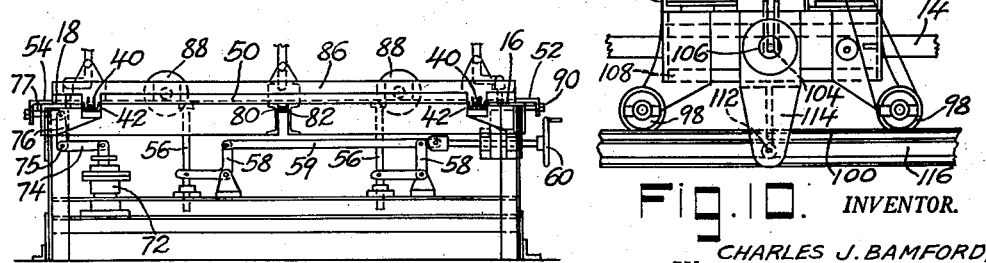
Fig. 8 is an end view of the assembly table shown in Figs. 6 and 7.

When the loader has been charged with all of the timbers and sub-assemblies required to produce a section, the carriage 38 is moved to the right as seen in Figs. 1, 2 and 4 until the lower end of the inclined support 44 is located adjacent a vertically movable abutment member 50 that extends at right angles to the conveyors 40 on assembly table 14. The top and bottom plates are then removed from the supports 46 on the carriage by operators located on opposite sides of the table 14. The bottom plate 22 is placed adjacent and parallel to a graduated guide 52 bolted to the support 16 and extending parallel thereto. The top plate 24 is similarly placed adjacent a movable guide 54 which extends parallel to the support 18. The right hand ends of the top and bottom plates are moved into engagement with the abutment member 50 which is shown in Figs. 7 and 8 and initially is held in a raised position by rods 56 connected through bell cranks 58 and link 59 to an actuating handle 60.

The foremost vertically extending element of the section, which in the section of Fig. 3 is the sub-assembly 30, is then deposited on the assembly table 14 by releasing the trip 62 on the end of the inclined support 44. The ends of the sub-assembly 30 are placed in the notches 36 in the ends of the plates 22 and 24 and while the operators are doing this the carriage 38 moves to the left until the lower end thereof is in position to locate the stud 34 in the proper position with respect to the top and bottom plates. The trip 62 is then operated again to release the stud which has been arranged next in order on the support 44. In a similar way each of the remaining timbers or sub-assemblies is placed in position until all of the elements of the framework have been deposited at the assembly station and the carriage 38 is emptied and moved back to the platform 48, for reloading to produce another building section.

The carriage 38 is moved back and forth by means of a motor 64 under the control of a switch 66 actuated by movement of the trip 62, and under control of contact member 68 actuated by the feeler 70. The control thus provided is such that operation of the trip 62 to deposit a vertical element on the supports 16 and 18 closes the switch 66 and energizes motor 64 causing the carriage 38 to move to the left. The carriage continues to move until a feeler 70 enters a recess 36 in one of the plates 22 or 24 whereupon the motor circuit is broken at contact 68 and movement of the carriage is stopped until the trip 62 is again actuated to cause the next element to be deposited on the supports 16 and 18 of assembly table 14. In this way the carriage is moved to the left into position to deposit each timber or sub-assembly in the proper position with respect to the top and bottom plates 22 and 24 and when the last vertically extending element is deposited the carriage moves back to the platform 48 for reloading.

It will of course be apparent that the discharge of the elements onto the assembly table may proceed from left to right if desired and in that event the timbers will be arranged on the loader in the reverse order so that the sub-assembly 32 will be deposited on the table first and the sub-assembly 30 discharged adjacent the abutment member 50 just prior to the full return of the loader to the platform 48.

By means of this construction all of the elements which make up the frame of a wall section are arranged quickly and in the proper order on the supports 16 and 18 of the table 14 at assembly station 2. Moreover, the loader may be so charged with timbers that the successive sections produced by the machine will be of different types, sizes and design and yet the same loading and assembly mechanism may be used without modification for each section. All of the wall sections for a single house may thus be produced in a desired order or sequence so that the sections will be discharged at the opposite end of the machine in the proper order for loading onto a truck or car and for removal and erection without sorting or rearranging the sections at the building site.

After the timbers or frame forming elements of a section have been assembled and arranged on the assembly table 14 as described above, the movable guide 54 located adjacent the support 18 is moved inward against the top plate 24 by means of a fluid actuated plunger 72 acting through lever 74 secured to a rod 75 which carries the arms 76 to which links 77 are connected. The bottom plate 22, which is already in engagement with the guide 52 adjacent support 16, is held stationary so that the movable guide serves to force the top plate inward and causes the ends of the vertically extending elements to be forced into the recesses 36 in the plates to clamp the timbers firmly together.

In order to clamp the timbers in place longitudinally and to square up the framework while providing for construction of building sections of different length, the mechanism is provided with a carriage 78 which is movable longitudinally of the table 14 by a chain 80 which lies in a centrally located channel 82 in the table. The chain 80 passes about the sprockets 83 and 84 and is attached at its opposite ends to the carriage 78 to pull the carriage back and forth into predetermined positions on operation of the motor 85. The carriage is locked in position after movement by catches 87 and thus is held firmly at a selected point on the table near the end of the section to be constructed. A movable end guide 86 is mounted on the carriage 78 and is movable to the right against the end sub-assembly 32 by means of the fluid operated jacks 88, whereby the end sub-assemblies 30 and 32 are forced into the recesses in the top and bottom plates and the whole frame is urged toward the abutment member 50. In this way all of the timbers are firmly clamped together and held securely and squarely in place insuring the formation of a strong and accurate construction.

While the guide 52 located adjacent the support 16 is held rigidly in place during any operation by the bolts 90, this guide may be shifted from one predetermined position to another to permit building sections of different height to be produced. For this purpose a plurality of series of bolt holes 92 are formed in the support 16 to correspond to standard section heights, such as 7 feet 6 inches, 8 feet, and 8 feet 6 inches. Since most of the sections for any building or for any one floor of a building are usually of the same height it will not be necessary to adjust the position of the guide 52 very often. However, this may be accomplished by loosening the bolts 90 and moving the guide over to another row of the bolt holes 92 and again securing it rigidly in place.

Figure 9:
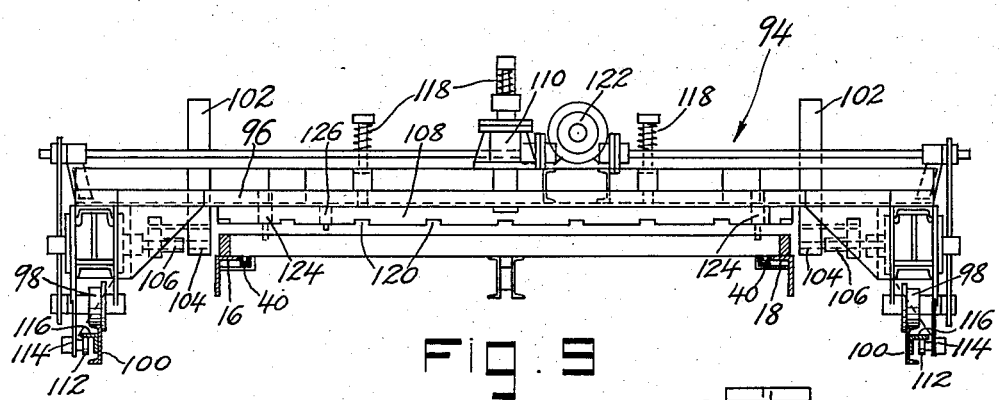
Fig. 9 is an end view of a typical nailing device adapted for use in the construction shown in Figs. 1 and 2.
Figure 10:
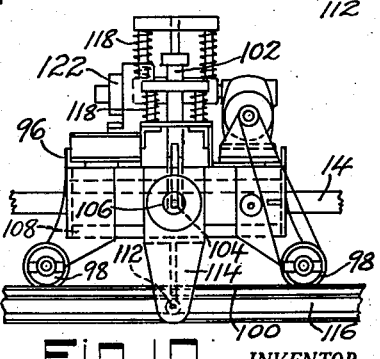
Fig. 10 is a side elevation of the nailing device illustrated in Fig. 9.
Figure 17:
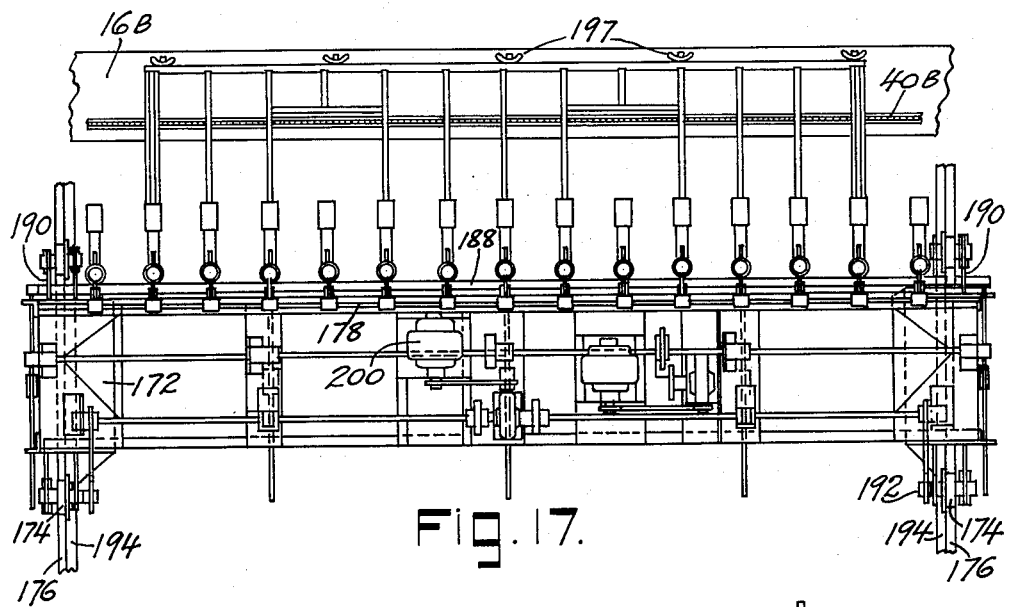
Fig. 17 is a top plan view of a typical glue applying device embodied in the construction shown in Figs. 1 and 2 with the glue tank and support removed.
Figure 18:
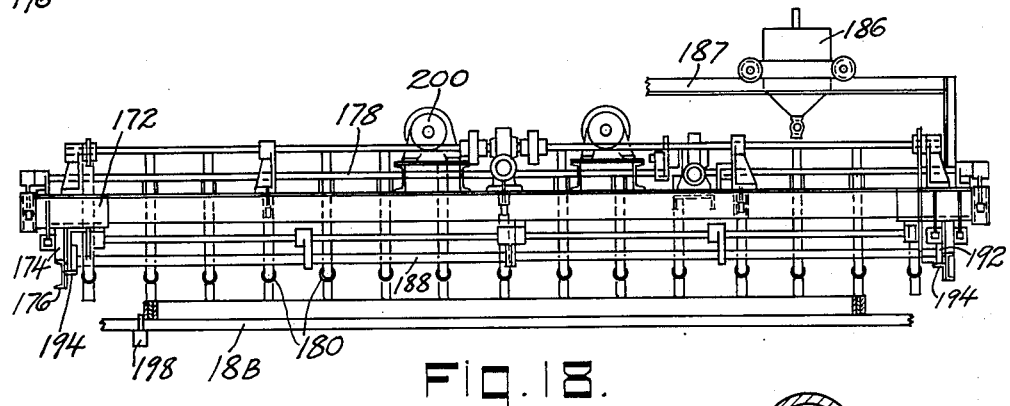
Fig. 18 is a vertical sectional view showing the glue applying device of Fig. 17 in elevation and partly broken away.
Figure 19:
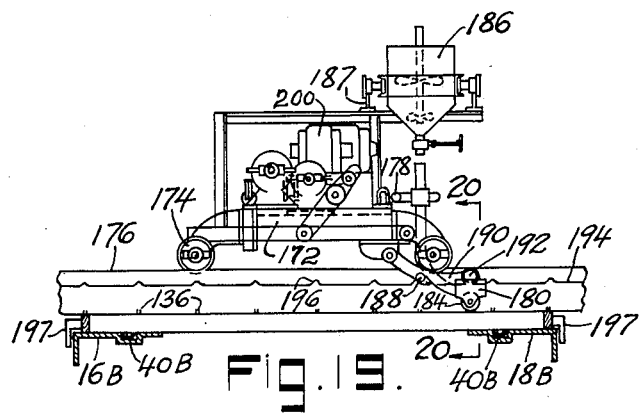
Fig. 19 is an end elevation of the glue applying device of Figs. 17 and 18.
Figure 20:
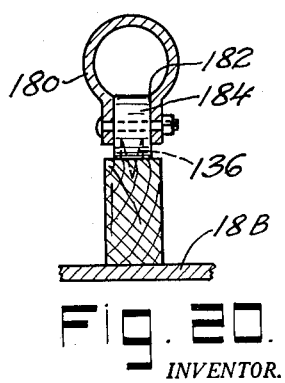
Fig. 20 is an enlarged view of a detail of the glue applying device illustrated in Figs. 17, 18 and 19.
Figure 21:
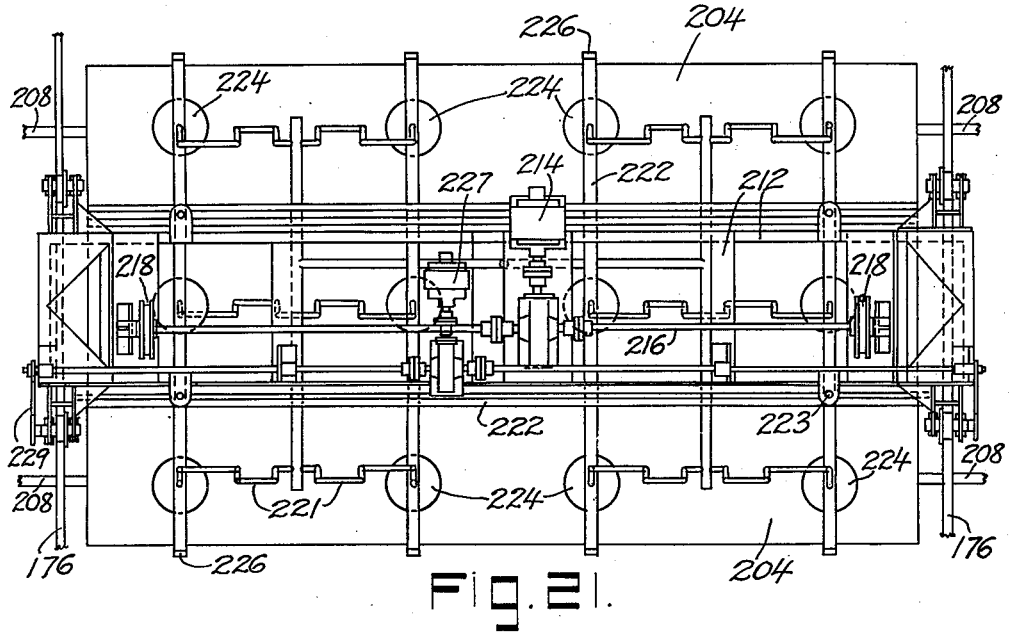
Fig. 21 is a top plan view of a device for lifting wallboard for application to structures made on the machine illustrated in Figs. 1 and 2.
Figure 22:
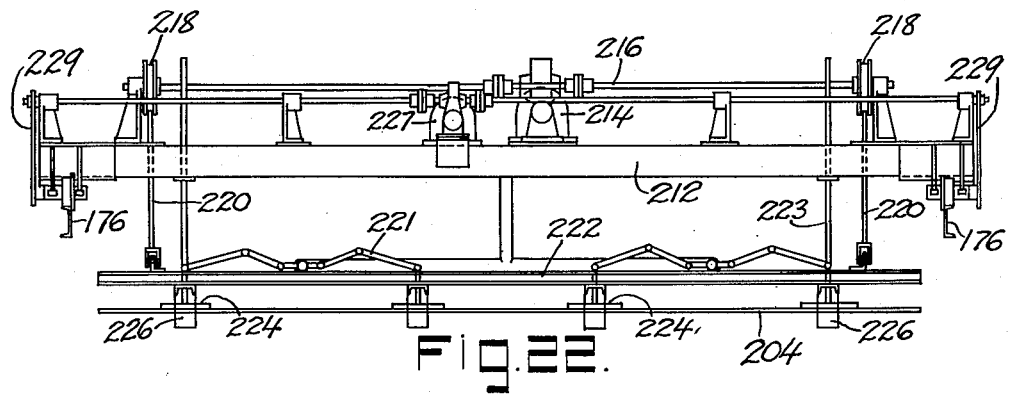
Fig. 22 is a view in elevation of the lifting device shown in Fig. 21.
Figure 23:
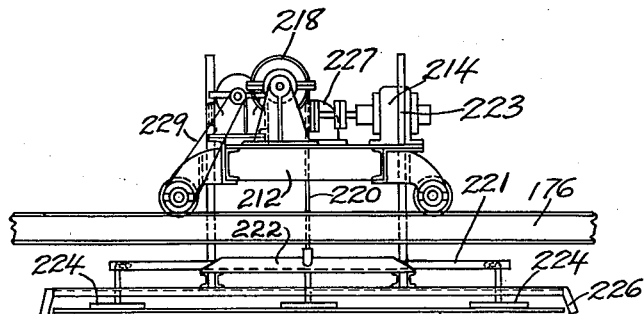
Fig. 23 is an end elevation of the lifting device illustrated in Figs. 21 and 22.

After the timbers forming any section have been positioned and forced into place as described above they are secured together by nails or other means. For this purpose a nailing device 94 is caused to travel over the assembled timbers and serves to drive nails through the plates 22 and 24 into the vertically extending timbers or sub-assemblies. As shown in Figs. 9, 10 and 11 the nailing device is provided with a carriage 96 mounted on wheels 98 and movable along tracks 100 running parallel to the supports 16 and 18 of the assembly table 14. The nails or other fastening means are supplied by feeders 102 which have their lower ends 104 formed and positioned to hold the nails in place to be driven through the top and bottom plates into the vertical members of the frame. Fluid actuated plungers 106 are located adjacent the lower ends of the nail feeder and when actuated they strip a nail from the feeder and drive it into the timbers.

The nailing device also includes a pressure plate 108 which is movable downward against the assembled timbers by fluid actuated means 110 to force the timbers against the supports 16 and 18 of the assembly table and prevent them from springing up or being displaced while clamped together or while the nails are being driven into place. Rollers 112 are carried by hangers 114 on carriage 96 and bear against the lower face of the secondary track 116 to hold the nailing device on tracks 100 when the pressure plate 108 is forced down against the timbers. Springs 118 on the pressure plate 108 and fluid actuated means 110, serve to cushion the action of the fluid actuated means and distribute the force applied to the timbers.

Since it may be desirable in some instances to provide the timbers, before assembly into the framework or during the nailing operation, with fastening elements for securing wallboard thereto, the pressure plate 108 may be provided with recesses 120 in the surface to allow for the presence of such fastening elements.

The nailing device is moved along the tracks 100 by a motor 122 and operation of the motor is controlled by switches 124 arranged to engage the vertically extending elements of the framework. The operation of the vertically movable pressure plate 108 is also controlled by the switches 124 to cause the timbers to be held in place whereas the operation of the nail driving means is controlled by switch 126 which is engaged by a timber when the plate 108 is lowered. In this way nails are driven through the top and bottom plates and into the vertically extending elements of the frame whenever the nailer is moved into the proper position for driving the nails and after the timbers have been forced down against the supports 16 and 18 on the assembly table.

The switches 124 are preferably located adjacent opposite edges of the section and are so connected to the nailing means that nails will be driven into the cripples 128 above the lintel of the door or into other similar members without driving nails through the bottom plate between the opposite members of the door sub-assembly. The carriage may also carry central and adjustably positioned nailing means where it is desired to drive nails outward through a door or window sill or otherwise to secure short vertically extending or special elements in place.

In operating the nailing device 94 the carriage 96 is moved over the assembled timbers travelling from right to left as seen in Figs. 1 and 10. When the switches 124 on the carriage engage a vertical element of the frame the motor circuit is broken so that the carriage is brought to rest and the pressure plate 108 is lowered. The switch 126 which controls operation of the nailing plungers 106 is lowered with the plate 108 and engages the timber thereby causing the nails to be driven through the top and bottom plates into the vertical timbers while they are held down on the assembly table. The motor 122 then moves the carriage 96 on to the next vertical element where the operation is repeated until all of the timbers of the frame have been secured together. The carriage is then returned toward the right to a point beyond the retractable abutment member 50 where it will be out of the way of the loader when the loader is next moved to deposit the timbers for another section onto the table 14.

When the frame for a building section has thus been produced, the abutment member 50 is moved downward out of the path of movement of the frame and the frame is advanced to the next station by means of the conveyors 40. These conveyors travel in the channels 42 adjacent the supports 16 and 18 on the assembly table 14. The conveyors preferably are in the form of chains each of which has a lug 125 thereon as shown in Fig. 7 and formed for engaging the end member or sub-assembly of the section adjacent the end guide 86. The conveyors pass about the sprockets 128 on the table 14 and the sprockets 130 located beyond the abutment member 50. The chains or conveyors 40 are driven by motor 132 to advance the framework of the section to the station 4 where fastening means are applied to the upper face of the timbers to receive and hold wallboard or other sheet material. After the section has been moved from the station 2 to the station 4, a new wall section or other structure of the same or other type, size or design may be produced at the station 2 while further operations are being performed on the first section.

The station 4 to which the framework of the section is advanced is shown in Figs. 1 and 2 as being located close to the assembly table 14 but when so arranged the completed framework cannot be wholly removed from the table 14 before starting the operations at station 4. Therefore it is preferable to provide an extended table or clearing station between the stations 2 and 4. Such a table is shown at 139 although shortened for purpose of illustration. This table is provided with supports 16A and 18A corresponding to the supports 16 and 18 of table 14 and should be as long as the longest section to be produced on the machine. Conveyors 40A on the table 139 are driven by motor 141 and receive the framework from the conveyors 40 and advance it to the station 4.

The fastening elements preferred when using this embodiment of my invention are shown in Fig. 12 and are in the form of metal members 136 which have downwardly projecting sharp prongs 138 and upwardly projecting sharp prongs 140. The prongs 138 are driven into the timbers to hold the fasteners in place while the upper exposed prongs 140 are positioned to engage the wallboard or other sheet material and provide a "blind" fastening for securing the wallboard to the face of the framework of the section.

The fastener applying device shown in Figs. 13 to 16 is stationary and mounted on the supports 142. The device includes a vertically movable cross head 144 which is raised and lowered by an eccentric 146 so as to move toward and away from the framework of the section. Springs 148 cushion the action of the cross head as it engages the timbers of the section. The cross head 144 carries the vertical chutes 150 through which fastening elements are fed into position to be stripped from the chutes by the ejecting plungers 152. The plungers 152 are slidably movable in guide slots 154 in the upper surface of a horizontal pressure plate 156 mounted on the cross head 144 and normally spaced from the supports 16A and 18A a distance sufficient to permit the passage of the framework beneath the plate 156. The plungers 152 are reciprocated by an arm 158 pivotally mounted on shaft 160 and actuated by a crank 162 driven by motor 164 which also is mounted on the plate 156. The right hand end of the plunger 152 as seen in Fig. 16 is movable past the lower end of the vertical chute 150 and serves to strip a fastening element from the chute and move it over the arcuate surface 166 into the vertical position shown in Fig. 16 in which the fastener is located beneath the hammers 168 carried by the cross head 144. The plate 156 is urged downward away from the cross head 144 by means of springs 169 so that when the cross head is fully raised the hammers 168 are lifted above the guide slots 154 in which the plungers 152 are movable.

Vertical movement of the cross head 144 is controlled by feeler switches 170 which are positioned to be engaged by the timbers of the framework as it is advanced beneath the plate 156 by the conveyors 40A.

With this construction, movement of the framework through the fastener device serves to bring each of the vertically extended timbers in turn into position to engage the feeler switches 170. These feeler switches control the operation of the motor by which the eccentric 146 is rotated. The feeler switches also serve to interrupt forward movement of the conveyors 40A so that the timber which actuated the feeler is brought to rest and positioned beneath the hammers 168 carried by the cross head 144. Rotation of the eccentric 146 then causes the cross head and plate 156 to be lowered until the plate engages the timber to press the timber downward against the supports 16A and 18A. Further downward movement of the plate 156 is then prevented while the cross head 144 continues to move downward. However, before the hammer 168 enters the guide slot 154 the motor 164 is actuated by switch 165 to reciprocate the plunger 152. The plunger 152 is thus caused to strip a fastening element 136 from the vertical chute 150 and move it into the vertical position shown in Fig. 16 to be driven into the upper face of the timber located beneath the hammer 168. The motor 164 is driven to rotate the crank 162 through one complete rotation so that the plunger 152 is actuated and then withdrawn from beneath the hammers 168 after positioning the fastening element. In this way continued downward movement of the hammer 168 serves to drive the downwardly projecting sharp prongs 138 of the fastening elements into the timber beneath the plate 156 to secure the fastener in place.

Upon rotation of the eccentric 146 to raise the cross head the hammer 168 is raised and upon continuing upward movement of the cross head the plate is raised from engagement with the timber leaving the upwardly projecting prongs 140 of the fastening elements exposed to receive sheet material to be applied to the section. Thereafter the section is advanced until another timber engages the feeler switches 170 when the operation is again repeated. In this way fastening elements for securing sheet material to the upper face of the framework are supplied at desired points throughout the framework.

When the sheet material to be applied to the building section is wallboard, plywood, or other material in relatively large sheets or sections it is usually desirable also to apply glue or adhesive to the surfaces of the timbers between the fastening elements. Therefore, in the machine illustrated, the next station to which the frame of the section is passed is the gluing station 6.

The gluing mechanism shown in detail in Figs. 17 to 20 embodies a carriage 172 mounted on wheels 174 and movable along tracks 176 which extend at right angles to the supports 16B and 18B by which the section framework is supported at station 6 and along which it is moved by the conveyors 40B. A bar 178 extends from one side of the carriage 172 to the other and glue appliers 180 are pivotally mounted on this bar. Fifteen glue appliers are shown but any suitable number may be provided. Each glue applier includes a tubular reservoir having the lower end closed except for the downwardly facing opening 182 into which the upper portion of the roller 184 extends. The roller 184 is thus supplied with glue and is positioned to engage the timbers so as to spread the glue evenly over the upper surface thereof. A tank 186 containing a heating element and stirrer is movable along the tracks 187 on carriage 172 to replenish the supply of glue to the tubular reservoirs.

The gluing device is designed to apply glue to the timbers of the frame only at those points between the fastening elements 136 and therefore means are provided for lifting the glue applying rollers 184 over the fastening elements as the device moves across the section framework and longitudinally of the vertical elements thereof. The lifting means provided include the bar 188 which is carried by arms 190 pivotally mounted on the carriage 172. The ends of the arms 190 are provided with rollers 192 which run along the tracks 194. Upwardly extending projections 196 are located at intervals along the tracks 194, say every 8 inches, or at other distances corresponding to the spacing of the fastening elements 136 on the timbers of the section framework. The bar 188 thus serves to raise the glue applying rollers 184 so that they will pass over the fastening elements.

In operating the gluing device the carriage 172 is initially positioned at one side of the supports 16B and 18B along which the section frame is moved as shown in Fig. 1. The framework to which the fastening members have been applied is moved from station 4 to station 6 by the conveyors 40B driven by motor 199 and is guided in its movement by the guide members 197 located along the supports 16B and 18B. Upon movement of a frame into engagement with a positioning trip 198 on the support 18B the motor 200 is actuated to move the carriage 172 along the tracks 176 and across the framework. The rollers 184 on the glue reservoirs then engage the timbers and spread the glue onto the upper surface thereof but when the rollers approach a fastening element 136 the rollers 192 on arms 190 engage the projections 196 on track 194 and raise the bar 188 so that the rollers are lifted over the fastening elements and the application of glue to the fastening elements is prevented. When the rollers 192 pass the projections 196 they are again lowered to apply glue to the portion of the timbers between the fastening elements. The device thus passes across the frame and the glue is applied to all of the vertically extending elements of the frame and throughout the length thereof except at the points where the fastening elements are located. Moreover, glue is applied to the cripples 128 or other short timbers embodied in the frame but no glue is wasted or spilled onto areas of the surface where it might be objectionable.

The construction shown provides for movement of the glue appliers 180 along the bar 178 so that they may be positioned over the timbers of any frame produced. When the frames are constructed on modular principles of design the timbers always fall in predetermined positions and the spacing of the glue nozzles is then simplified.

The application of glue to the longitudinally extending members of the frame is generally not necessary but these members may be supplied with glue by hand or by supplemental gluing means constructed similarly to that described above and arranged between the fastener applying station 4 and the gluing station 6.

It is desirable to apply the wallboard or sheet material to the section frame promptly after applying the glue and for this purpose the sheet applying device is arranged for movement along the tracks 176 beyond the glue applying device. The glue applying device therefore is movable to a position beyond the support 16B as shown in Fig. 1 so that the sheet applying device may be moved into position over the framework to deposit the sheet material thereon.

The tracks 176 along which the sheet applying device moves extend over tracks 208 along which a truck 210 is movable as shown in Fig. 1.

Sheets of wallboard or other material 204 are stacked on the truck 210 and the truck is moved into position beneath the tracks 176. The frame 212 of the sheet applying device carries a motor 214 which rotates shaft 216 carrying pulleys 218 from which cables 220 extend to the carrier 222. The motor 214 is thus operable to raise and lower the carrier.

A number of suction members 224 are connected to a suitable source of vacuum by flexible connections 221 and are mounted on the carrier 222 so as to be movable therewith into a lowered position in which they engage the uppermost sheet of wallboard on the truck 210 and into a raised position in which they lift the top sheet from the stack. The carrier 222 is provided with vertically movable guides 223 which insure proper movement of the carrier as it is raised and lowered. Marginal guide members 226 extend downward below the suction members and are positioned to engage the top sheet 204 and shift the carrier and suction members so as to position the sheet accurately with respect thereto. The sheet applying device is moved toward the supports 16B and 18B as the glue applying device is moved back to an idle position beyond the support 16B by motor 227 and belts 229. In this way the sheet applying device is operable to lift a sheet of wallboard from the truck 210 and move it into position above the section framework located at station 6. Thereafter the sheet is lowered onto the upper surface of the framework and the guides 226 on the carrier 222 engage the timbers of the framework to position the sheet accurately with respect to the framework. When the sheet material has been accurately positioned the vacuum applied to the suction members 224 is broken and the carriage and suction members are raised so as to leave the wallboard or other sheet material resting upon the framework in position for attachment to the upper face thereof by the fastening elements 136 and the glue which is carried by the timbers.

After the sheet material has been located on the upper face of the timber frame, the assembled frame and wallboard are passed from the supports 16B and 18B to corresponding supports 16C and 18C at station 8. At this station there is a press 230 shown in Figs. 24, 25 and 26 for forcing the wallboard or sheet material downward so that the upwardly projecting prongs 140 of the fastening elements 136 will penetrate the wallboard and the wallboard will be pressed firmly into engagement with the glue on the timbers.

The press 230 is mounted on stationary piers 232 located adjacent supports 16C and 18C and having bearings 234 within which shafts 236 are vertically movable. The lower ends of the shafts 236 are connected to a cross head 238 which is movable vertically by an eccentric 240 on a shaft 242 driven by motor 244. The upper ends of the vertically movable shafts 236 carry a flat press block 246 and are provided with springs 248 whereby the block 246 is yieldably pressed against the upper face of the sheet material positioned on the framework of the section and serves to force the sheet downward into engagement with the timbers of the framework.

The frequency of operation of the press block and the movement of the assembled framework and sheet material past the press, are coordinated to insure the application of pressure to the sheet material throughout the entire length and area of the section frame.

When thermo-plastic, thermo-setting or other special adhesives or bonding agents are used for securing the wallboard or sheet material to the framework the press may further include a heating element 257 located adjacent the face of the press block 246 or elsewhere to insure setting or activation of the bonding material. The heating element may be of the resistance type or be an induction, high frequency or radiant type of heating means or may be of the electronic type as desired.

Figure 25:
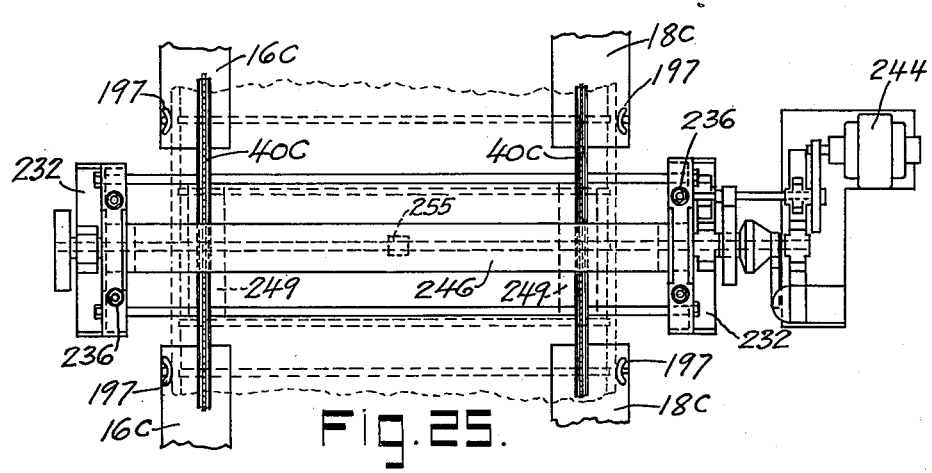
Fig. 25 is a top plan view of the press illustrated in Fig. 24.
Figure 24:
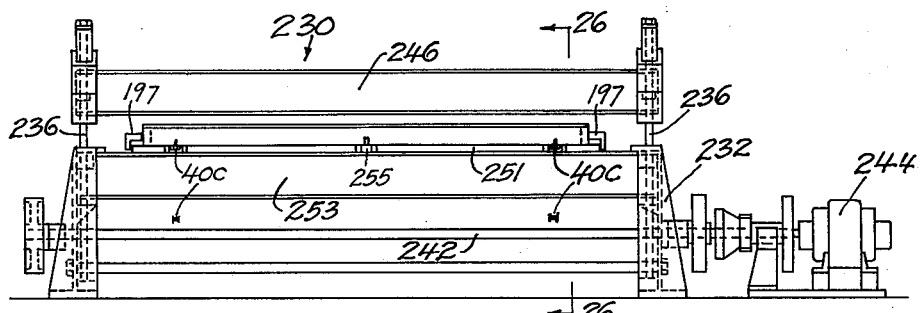
Fig. 24 is a vertical sectional view through the construction illustrated in Figs. 1 and 2 showing a typical press in elevation.
Figure 26:
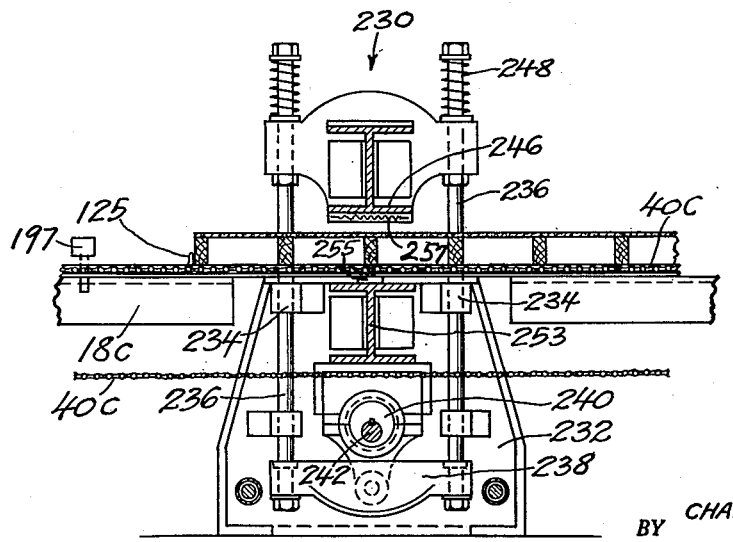
Fig. 26 is a vertical sectional view of the press illustrated in Fig. 24 taken on the line 26—26 of Fig. 24.

The assembly is preferably advanced step by step and held stationary during the pressing operation. This may be effected by the conveyor 40B at the glue applying station 6. However, when space permits it is preferable to separate the press at station 8 from the gluing station 6 so that the assembled section framework and sheet material may be moved all the way beyond station 6 before passing beneath the press 230. In this way the gluing and sheet applying operations will not be held up by the pressing operation. Under such circumstances and as shown in Figs. 24 to 26 the station 8 is provided with conveyors 40C driven by motor 250. These conveyors ride in slots 249 in a spacer plate 251 on the bed 253 of the press and their movement is controlled by feeler switches 225 so as to advance the assembly a distance not exceeding the width of the press block 246 on each forward step in its movement. The width of the press block may of course be varied but preferably is at least equal to the spacing of the studs in the framework and it may be the full area of a completed section.

After passing the press 230 the framework with the wallboard or sheet material firmly attached thereto passes on to station 10 where the marginal edges of the sheet material are trimmed off and the portion of the sheet material covering door and window openings, electrical outlet openings and the like are cut from the sheet. The mechanism shown at station 10 includes two vertically moving units 252 and 254. The unit 252 is provided with saws 256 and 258 for forming cuts in the sheet material extending longitudinally of the section while the unit 254 is provided with saws 260 and 262 for forming cuts in the sheet material extending transversely of the section.

The unit 252 by which the longitudinal cuts in the sheet material are made is shown in Figs. 27, 28 and 29 as embodying a frame 264 pivotally mounted at 266 on the pier 268 near one end of the unit, whereas the opposite end of the frame is provided with a roller 270 which bears against the surface of an eccentric 272 mounted on a shaft 273 driven by motor 274 through gearing 275. The frame 264 of the unit 252 is therefore tiltable to move the saws 256 and 258 into and out of cutting engagement with the sheet material on the section framework. As shown in Fig. 28 the saws are lowered into position to form longitudinal cuts in the sheet material 204 on the framework.

The saws themselves are rotatably mounted on hangers 276 which project downward from supports 278 movably mounted on a carriage 280 that extends across the frame 264 at right angles to the supports 16D and 18D along which the assembled framework and sheet material are advanced. The supports 278 by which the saws are carried are provided with motors 282 for driving the saws and are adjustable along the carriage 280 and transversely of the sections by means of threaded shafts 284 provided with hand wheels 286. The saw 258 when in the position of Fig. 27 serves to trim the wallboard from the edge of the section, but when in the position of Fig. 29 forms a cut in the body of the section. The carriage 280 on which the saws and motors are mounted is itself mounted on tracks 288 on frame 264 and is movable along the frame by means of motor 290 and chain 292.

The construction shown and described may be operated in either of two alternative ways to form the desired longitudinal cuts in the sheet material.

In accordance with one method the frame 264 of unit 252 is elevated to raise the saws 256 and 258 above the section carrying the sheet material to be cut. The section is then moved into place beneath the unit by the conveyors 40D and is held stationary while the longitudinal cuts are made. The saws are moved to the proper positions for forming the desired cuts in the wallboard carried by the section by operation of hand wheels 286 and the frame is lowered to cause the saws to cut the sheet material. The saws and carriage 280 are moved longitudinally of the section by operation of the motor 290 which drives chains 292 until the saws have been moved the proper distance to form a longitudinally extending cut of the desired length. The motor 274 is then actuated to raise the saws out of engagement with the material. The saws are then moved to new positions to form other cuts by operating the motor 290 and hand wheels 286 and the frame 264, and saws 256 and 258 are again lowered and the saws advanced by motor 290. In this way all of the longitudinally extending cuts for the doors, windows and other openings and for trimming the edges of the section can be formed in the sheet material while the section remains stationary.

In the alternative and preferred practice the frame 264 of the unit 252 is raised and lowered automatically while the section is being advanced through the machine. The carriage 280 which carries the saws 256 and 258 is then held in a fixed position on the unit and the length of the longitudinal cuts in the sheet material is controlled by the speed at which the section is advanced and the length of time the frame and saws are held in lowered and cutting position.

Figure 30:
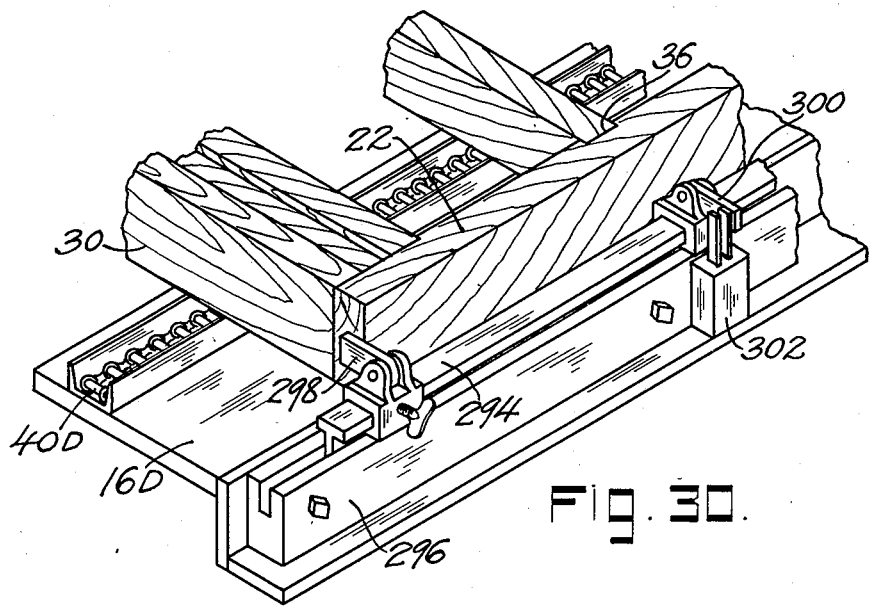
Fig. 30 is a perspective of a portion of the machine illustrated in Figs. 1 and 2 showing typical control means.
Figure 37:
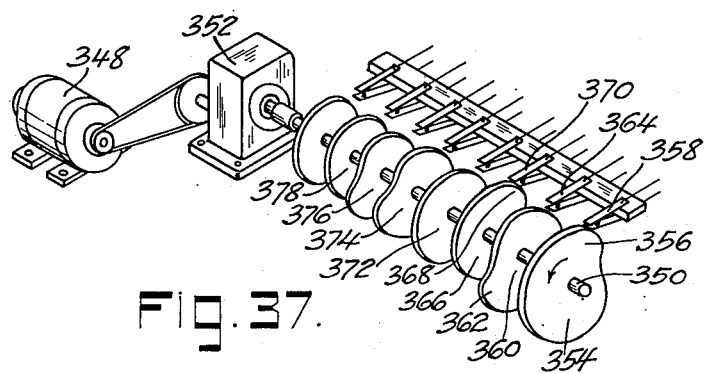
Fig. 37 is a diagrammatic illustration of typical means for controlling the operation of the machine illustrated in Figs. 1 and 2.

When using either method of forming the longitudinal cuts in the sheet material the control of movement of the saws and unit is preferably effected automatically. This may be accomplished most conveniently by providing control elements which are movable with the section itself. As shown in Figs. 28 and 30 a control bar 294 is slidably mounted in guides 296 on the support 16D adjacent the bottom plate 22 of the section being advanced through the machine. The projection 298 on the end of the control bar 294 engages the leading end of the section so as to cause the bar to be positioned and moved with the section as it advances. Control detents 300 are adjustably mounted on the control bar and are positioned by an operator at station 8 so as to be located at points where the cuts are to start and end or in any other suitable positions to insure the desired movement of the unit and saws for forming the cuts.

Control switches 302 are located on the support 16D in position to be engaged by the control detents as the control bar and section are advanced. These switches are suitably connected to the motors 274 and 290 to insure the proper operation and movement of the frame 264 of unit 252 and saws 256 and 258 to form the desired cuts. When the section is moved all the way into place beneath the unit 252 before forming any cuts in the sheet material the switches 302 and mounted on the unit 252 and are movable with carriage 280 while the section and control bar remain stationary.

With this construction all of the longitudinally extending cuts in the sheet material may be formed by the saws 256 and 258 of the unit 252. The section thus cut is then advanced by conveyors 40D driven by motor 304 and is moved into position beneath the unit 254 and saws 260 and 262 which serve to form the vertically extending cuts in the sheet material for finishing the openings and finally trimming the building section.

Figures 31, 32:
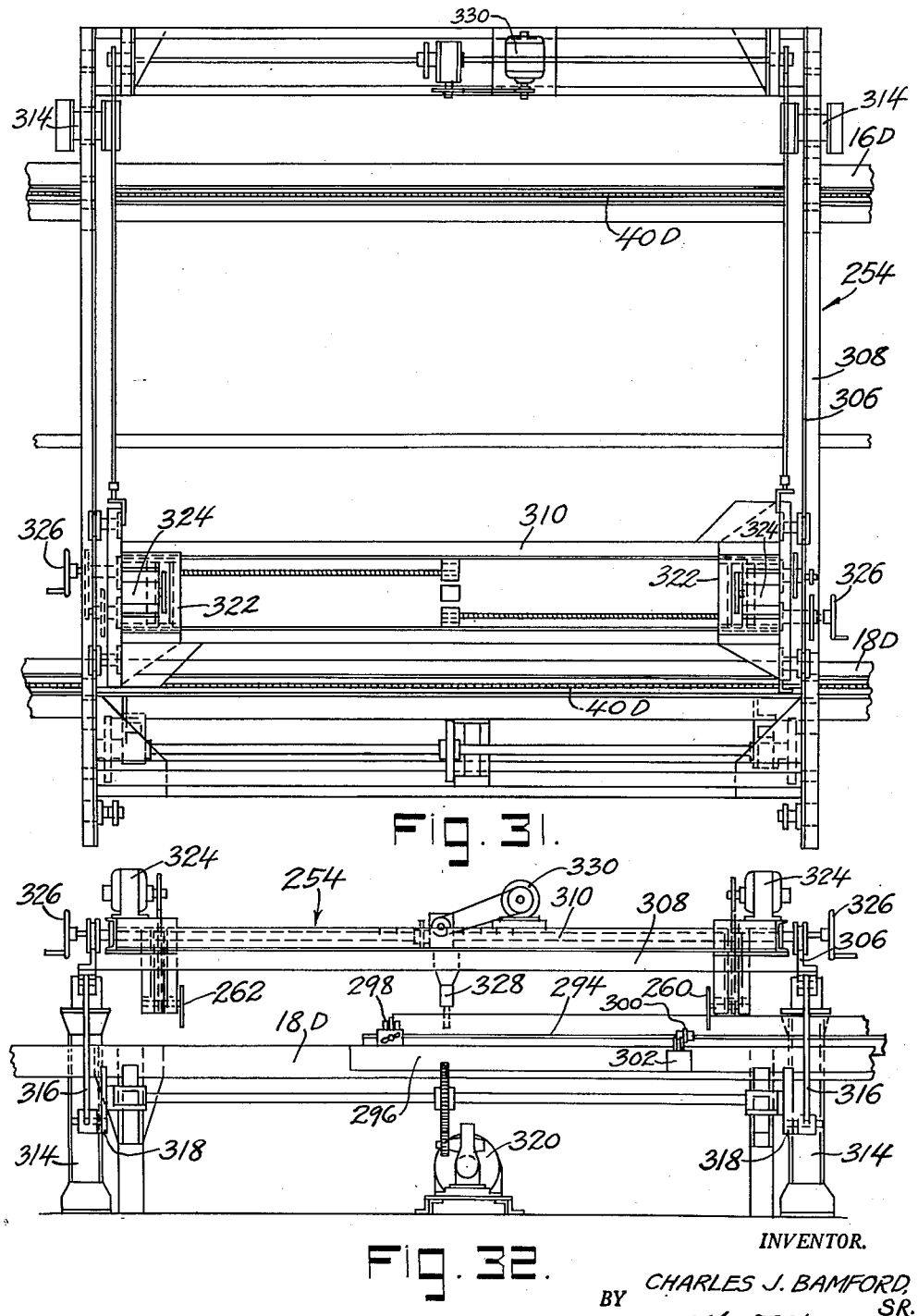
Fig. 31 is a top plan view of mechanism for forming transversely extending cuts in wallboard or sheet material in accordance with the present invention.
Fig. 32 is a side elevation of the mechanism in Fig. 31.

The mechanism embodied in the unit 254 is shown in Figs. 31, 32 and 33 but is essentially the same or similar to the mechanism associated with the unit 252. The tracks 306 on frame 308 along which the carriage 310 is movable extend at right angles to those of unit 252 and at right angles to the supports 16D and 18D and conveyors 40D so that the saws may be moved transversely of the section. The movements of the frame 308 and saws 260 and 262 are best controlled by an operator stationed at the unit 254.

The mechanism employed for raising and lowering the unit is similar to that described above in connection with unit 252 in that the frame 308 is pivotally mounted at 312 on piers 314 located adjacent the support 16D along which the section is moved, whereas the opposite end of the frame is raised and lowered by means located adjacent the support 18D on the other sides of the section. In the construction shown, tilting of the frame 208 is effected by the link 316 connected to a crank 318 driven by the motor 320. The saws 260 and 262 are mounted on supports 322 and driven by motors 324 and they are adjustable along the carriage 310 by hand wheels 326.

Control of the vertical movements of the saws and frame relative to the work may, if desired, be effected by a switch 328 mounted on the frame 308 and engageable with the elements 300 on the control bar 294 while movements of the saws and frame 310 transversely of the section may be effected by motor 330 under control of an operator at station 10.

When the wall section produced is to be provided with wallboard on only one face thereof the section as finished after completion of the operations by the unit 254 may be removed from the machine and is ready for erection in a building or elsewhere. When there are no openings to be formed in a section of this character it obviously may be removed from the machine without passing through station 10 or beneath the cutting units 252 and 254. However, in most instances the wall sections are provided with wallboard or sheet material which covers both faces of the section frame.

Figure 36:
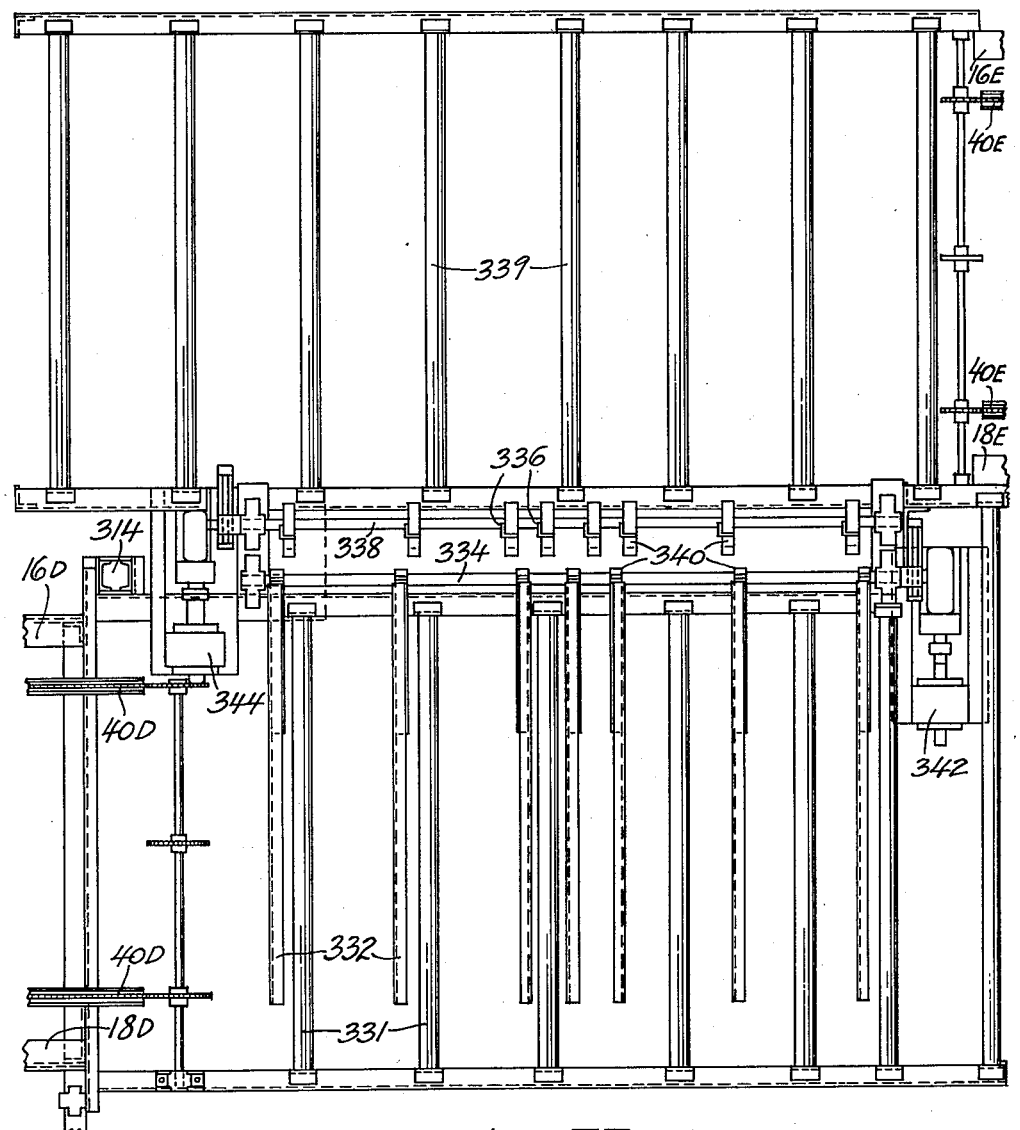
Fig. 36 is a top plan view of the mechanism illustrated in Figs. 34 and 35.

The section leaving the second unit 254 of the station 10 is then passed to station 12 where it is delivered onto rollers 331 above the bars 332 of mechanism shown in Figs. 34, 35 and 36 for turning the section over so that the opposite face of the framework will face upward. The bars 332 are carried by a shaft 334 which is rotatable to move the bars through an arc of somewhat more than 90° to deliver the section to complementary bars 336 carried by a shaft 338 for lowering the section onto the rollers 339 which are in alignment with supports 16E and 17E which correspond to the supports 16 and 18 of the assembly table 14. The bars 332 and 336 are provided with projections 340 for supporting the edge of the section as it is turned over. The positions of these projections and bars are such that they are staggered to enable each to move through the desired arcs without interfering with the other. The shafts 334 and 338 by which the bars are carried, are driven by motors 342 and 344 respectively and their operation is timed to turn the section over and yet prevent it from slipping, falling or being subjected to shocks which might injure or distort the section while it is being inverted.

The inverted section deposited on the rollers 339 is in alignment with the supports 16E and 18E and is advanced by conveyors 40E to a second group of stations including a second fastener applying device, a second gluing mechanism, a second sheet applying device, a second press and a second cutting and trimming device corresponding to the mechanism shown at stations 4, 6, 8 and 10. At these stations the sheet material is applied and secured to the opposite face of the section and the sheet material is cut and the section finished for erection. Since the mechanisms at these further stations may be duplications of those previously described and shown in the drawings the additional elements are not illustrated again and need no further description.

The final wall section produced and delivered from the second finishing station of the machine has wallboard or sheet material applied to both faces of a wooden framework and the section is accurately constructed with the door and window openings, as well as the openings for electrical outlets, plumbing fixtures, etc., all produced in the section. The wall sections therefore are ready for immediate assembly and erection to produce a building and they may be produced and delivered from the machine in such a sequence that all of the sections necessary for producing a building or a part of a building are discharged in the order in which they will be used for erection of a building. The sections can therefore be loaded onto a truck or freight car directly as produced or they may be stacked or stored in such a way that they will not have to be sorted out or moved about unnecessarily when taken to the site for erection.

For most efficient operation it is desirable to coordinate the operations of the various elements of the machine described to make it fully automatic. In such cases it is possible to employ a unitary control device for timing and actuating the movement of the conveyors and for timing the operations performed at the various stations in the machine. For this purpose a control device such as that shown in Fig. 37 may be employed. In this construction a motor 348 is connected to a shaft 350 through reduction gearing 352. The shaft 350 carries one contact disc or cam corresponding to each of the conveyors used for advancing the section through the machine. It will be understood of course that when a single conveyor is used for moving the section through or past several or all stations in the machine the number and form of the contact discs will be varied. Similarly the shaft 350 may carry cams or other circuit control means which serve to time and control the operations performed at any station within the machine and thus the manner of operation of the mechanism as a whole may be varied or modified from time to time and the order in which the operations are performed may be changed by shifting the stations about and altering the control mechanism accordingly.

In controlling the operation of the machine illustrated in Figs. 1 to 37 the shaft 350 is provided with a cam 354 having a node or high point 356 and is movable clockwise to close a contact 358 for completing a circuit to energize motor 64 on the loader and initiate movement of the loader 20 toward the right in starting the construction of a building section. The further movements of the loader are preferably controlled by the switches and contacts 66 and 68 on the loader as described above.

Cam 360 on shaft 350 is provided with a high point 362 movable to close contact 364 connected to the motor 132 by which the conveyors 40 on the assembly table 14 are operated to discharge the framework from the assembly table to the clearing table 139 whereby it may be inspected prior to its movement to the fastener applying device at station 4. The position of the high point 362 on cam 360 is so disposed with reference to the high point 356 on cam 354 that a circuit will not be completed through contact 364 to cause the conveyors 40 to be actuated until the operations of the loader and clamping and nailing devices have been completed. Although the latter operations are best controlled at the assembly table itself the time allowed for completing these operations may be determined very closely by time study procedure and the relative positions of cams 354 and 360 thereby established.

In a similar way the cam 366 is provided with a high point 368 for closing contact 370 to control operation of motor 141 for actuating conveyor 40A to advance the framework through the fastener applying device at station 4.

Any one or all of the remaining operations may be controlled by similar cams 372, 374, 376 and 378 and the various elements of the machine may be coordinated and timed to insure speedy and proper construction of the building sections or other structures being fabricated.

While such coordination of the mechanism is desirable when the sections or structures being made are identical, it is more often desired to provide flexibility of operation, particularly when constructing the various sections used in the erection of prefabricated buildings. For this reason the control device above described is frequently rendered inoperative and at least part of the operations controlled by suitable switches or elements located at each station along the machine. If desired control means of the type illustrated in Fig. 37 or other suitable mechanism may be located at each station to control or time the operations performed within that station. A master control device then may be used for setting in operation the successive control devices at the stations to afford simplicity and permit variation of the timing of operations within the limits of each station while maintaining an overall control and speed of operation.

When using the machine described each section is constructed with a measure of accuracy and strength which cannot be assured when the operations are carried out by hand. Furthermore, the size, style and design of the sections may be varied infinitely and they may be constructed one after another on the machine without interruption in its operation.

In some instances the space available for the fabrication of building sections is limited and the number of sections to be made is not so great as to require the speed and continuity of operation for which the machine described above is designed. In such cases it is not economically feasible to use this construction. However, it is possible to combine certain of the operations and to simplify the construction under such circumstances and the mechanism illustrated in Figs. 38 to 48 is typical of less expensive mechanism for more limited output of prefabricated building sections.

The mechanism shown diagrammatically in Figs. 38 and 39 includes an assembly station 400, a stapling and fastener applying station 402, a sheet applying station 404, a press 406, a cutting and finishing station 408 and a final clearing station 410.

At the assembly station the timbers are arranged to form the framework of the section or structure according to predetermined plan. A loader such as that shown in Fig. 4 may be used for this purpose although the timbers may be assembled and arranged by hand if desired. The timbers are placed on the bed 412 of a carriage 414 which is mounted on wheels 416 which run on tracks 418 for moving the section through stations 400 to 406 and to the station 408.

The bed 412 of the carriage is formed with fixed guides 420 located adjacent one edge of the bed and secured in a fixed position by bolts 422 which pass through one of the series of holes 424. The guides 420 may be changed from one position to another to produce a wall section of any standard height corresponding to the various series of bolt holes.

A movable guide 426 extends parallel to the opposite edge of the carriage and is movable toward and away from the guides 420 by means of fluid operated means 428 which acts upon the bar 430 to which bell cranks 432 are connected. The bell cranks are pivotally mounted on the carriage at 434 and are connected at their opposite ends to the links 436 secured to the movable guide 426.

Figure 42:
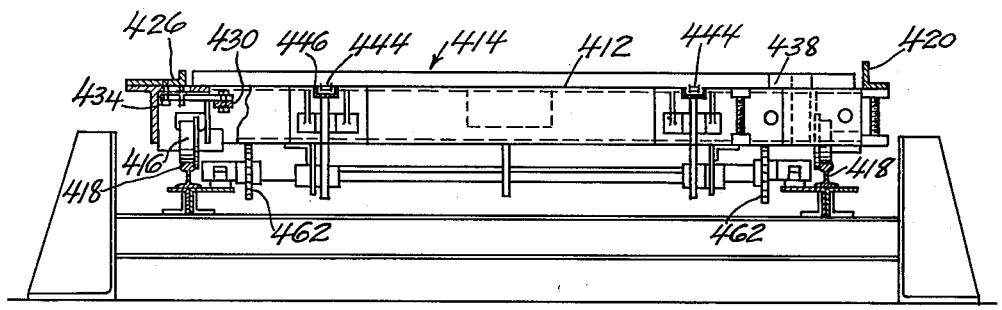
Fig. 42 is a vertical sectional view through the construction illustrated in Figs. 38 and 39, showing the carriage in end elevation.

Stationary end guides 438 are removably mounted on the carriage and serve as abutment members against which the end assembly of the section framework being fabricated may be placed. One of the end guides is removed from the carriage as seen in Fig. 42 in order to illustrate other elements of the construction. The opposite end assembly of the section framework is held in place and the timbers of the framework are squared and clamped together by a movable end guide 440 mounted on a cross-frame 442 slidably movable over the bed of the carriage. The movable end guide 440 and the cross-frame are moved longitudinally of the carriage by means of chains 444 which lies in the channels 446 in the bed 412 and have their opposite ends attached to the cross-frame 442. The chains 444 pass about the sprockets 448 and 450 at the opposite ends of the carriage 412 and are driven by a sprocket 452 on shaft 454 driven by motor 456 mounted beneath the bed of the carriage. The motor is provided with suitable controls such as a slip clutch (not shown) to move the cross-frame and end guide 440 so as to apply a limited and predetermined clamping pressure on the timbers of the framework. The end guide is squared in place by the adjusting screws 458.

In using the construction described, the timbers which are to make up the framework of a section or other structure to be fabricated are assembled on the bed 412 of the carriage 414. When making the framework of a section such as that shown in Fig. 3, the end sub-assembly 30 is located adjacent the abutment members or fixed end guide 438 whereas the opposite end sub-assembly 32 is located adjacent the movable end guide 440 carried by the cross-frame 442. The bottom plate 22 of the section framework is located adjacent the fixed guides 420 adjacent one edge of the carriage and the top plate 24 of the framework is located adjacent the movable guide 426 which extend parallel to the opposite edge of the carriage 414. The vertically extending members of the framework are located between the top and bottom plate on the bed 412 of the carriage. All of these timbers may be positioned by hand and are then forced together and clamped firmly and squarely in place by operation of the motor 456 which drives the chains 444 connected to the cross-frame 442 to force the movable end guide 440 against the end sub-assembly 32 of the section framework, and by operation of the movable guide 426 which is urged against the top plate 24 of the framework by operation of the fluid operated means 428 to force the vertically extending timbers into the recesses 36 in the top and bottom plates of the framework.

When all of the timbers of the framework have been assembled and clamped together as described above, the carriage carrying the framework is moved to the right from its loading position shown at station 430 in Figs. 38 and 39 into position beneath a stapling and fastener applying device indicated at station 402 in Figs. 38 and 39, as shown in detail in Figs. 43 to 47.

Movement of the carriage and timbers over the framework through the stapling and fastener applying device and to other stations of the mechanism is effected by means of the chains 460 which pass around sprockets 462 mounted on the base 464 of the machine at station 400 and about the sprockets 466 located adjacent the cutting and finishing station 408 as seen in Figs. 39 and 40. The sprockets 466 are driven by the motor 468 and the opposite ends of the chains 460 are connected to hanger 470 rigidly secured to the lower face of the bed of the carriage 414 to move the carriage back and forth along the tracks 418. The carriage and framework preferably are advanced step by step through station 402 and while at said station the timbers are secured together by suitable means such as the large staples 472. At the same time fastening elements 474 are applied to the upper face of the timbers as "blind fasteners" for securing wallboard or other sheet material to the framework of the section.

The stapling and fastener applying device illustrated is designed to apply the large staples 472 and the fastening elements 474 simultaneously to the timbers of the section and as illustrated the construction embodies a cross-head 476 which extends transversely of the carriage and above the timbers thereon. The cross-head is mounted on vertical rods 478 which are spanned at their upper and lower ends by webs 480. The lower of these webs is secured to the eccentric 482 which is mounted on shaft 484 and driven by a motor (not shown). Rotation of the shaft 484 and eccentric 482 serves to raise and lower the rods 478 and the cross-head 476. Beneath the cross-head 476 is located a press member 488 which is slidable with respect to the vertical rods 478 and is urged downward away from the cross-head and toward the timbers on the carriage 414 by means of the springs 490. Downward movement of the press member is limited by the nuts 492 on the rods 478.

The means for driving both the large staples 472 and the fastening elements 474 are mounted on the press member 488. As shown the staples 472 are positioned and driven by mechanism generally similar to a Bostitch press which includes a follower 494 engageable with the end one of a series of staples in a guide channel 496. The foremost staple in the series is located beneath a plunger 498 connected to the cross-head 476. The staples are urged into position beneath the plunger 498 by the action of a spring 400 connected to an arm 502 which engages the follower 494.

With this construction the cross-head when raised is spaced from the press member 488 far enough to raise the plunger 498 above the guide channel 496. The follower 494 therefore serves to move the foremost staple into position beneath the plunger so that it is properly located with respect to the timbers of the framework and may be driven into the timbers so as to secure them together. When in this position the pressure of the follower on the series of staples prevents the foremost staple from dropping out of the stapling device and locates it accurately for driving purposes.

Upon downward movement of the vertical rods 478 and cross-head 476 due to rotation of the eccentric 482 the press member 488 is brought into engagement with the upper face of the timbers of the framework on the bed of the carriage 414. Continued downward movement of the cross-head after the press member engages the timbers of the framework serves to compress the springs 490 and forces the press member against the timbers so that they are held down on the bed of the carriage and any displacement of the timbers is corrected before the staples 472 are driven. During such downward movement of the cross-head with respect to the press member the plunger 498 is moved into engagement with the foremost staple in the guide channel 496 and thus serves to strip the staple from the channel and drive it into the timbers.

Upon upward movement of the vertical rods 478 and cross-head 476 the plunger 498 is raised before the press member 488 and until the guide channel 496 is clear. Thereupon the follower 494 moves the series of staples forward until another staple is located beneath the plunger 498 so that the mechanism is ready for the necessary stapling operation. Further upward movement of the vertical rods 478 brings the nuts 492 into engagement with the press member 488 so that the press member is raised from the timbers and the carriage is free to advance to a new position for driving other staples into other timbers or at other points along the framework of the section being constructed.

The means for applying the fastening elements 474 to the upper face of the timbers are also located on the press member 488 and a suitable number of such means are arranged to locate the fastening elements at various points on the timbers, say every 8 inches apart, over the surface of the section. These fastening elements are generally similar to those of Fig. 12 but may be formed from a continuous strip of material by mechanism which strikes off a short section of the strip and forms it during the operation of driving it into the timbers. The details of the mechanism for striking off a section of a continuous strip and forming the staple 474 during the driving operation form no part of the present invention, but are equipment furnished by manufacturers of this type of device.

Figure 43:
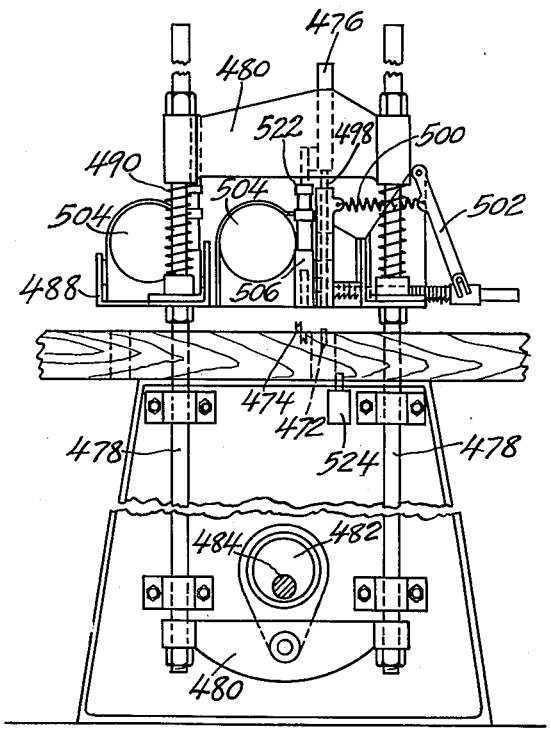
Fig. 43 is an end elevation of a preferred form of fastener applying device used in the construction of Figs. 38 and 39.
Figure 44:
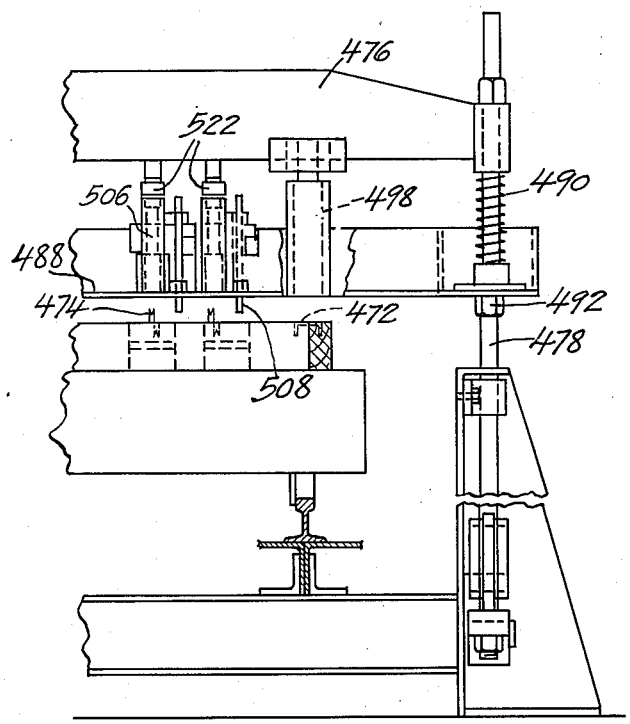
Fig. 44 is a view in elevation of a portion of the fastener applying device of Fig. 43.
Figure 47:
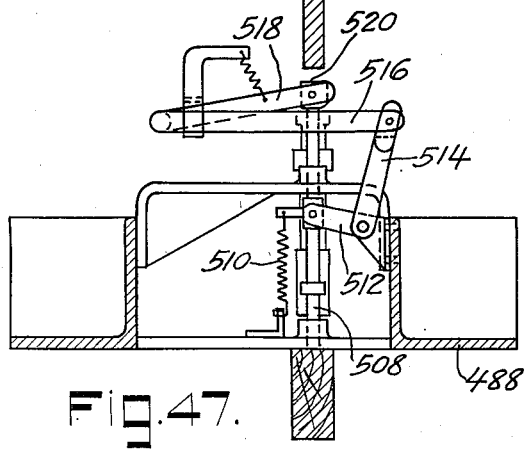
Fig. 47 is an enlarged view of a detail of the construction shown in Fig. 46 showing the parts in a different position.

The strip of material from which the staples 474 are formed is housed in the circular chamber 504 and is advanced into position beneath the plunger 506 shown in Figs. 43, 44 and 47 and above the points on the timbers at which the fastener is to be applied.

Figure 46:
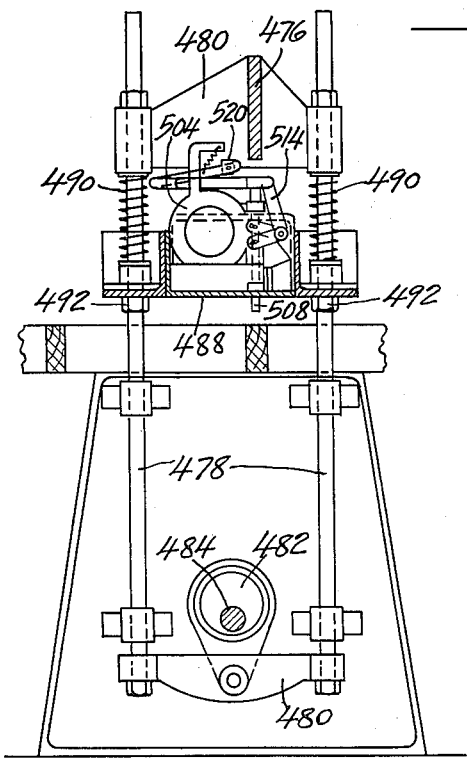
Fig. 46 is a vertical sectional view of a construction illustrated in Fig. 43 showing the parts in one position of operation.
Figure 45:
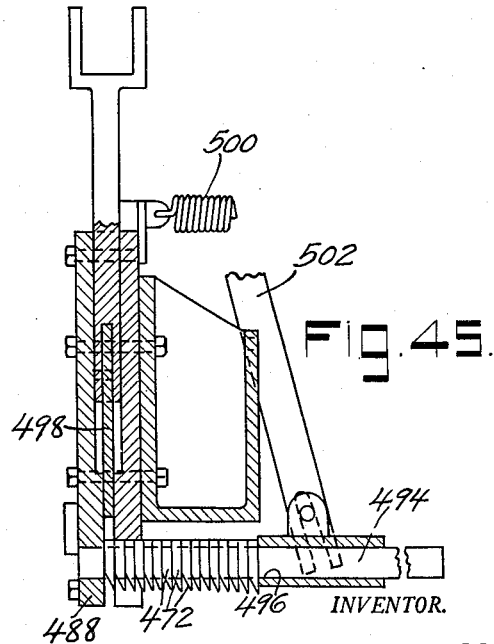
Fig. 45 is an enlarged sectional view of a detail of the construction illustrated in Fig. 43.
Figure 48:
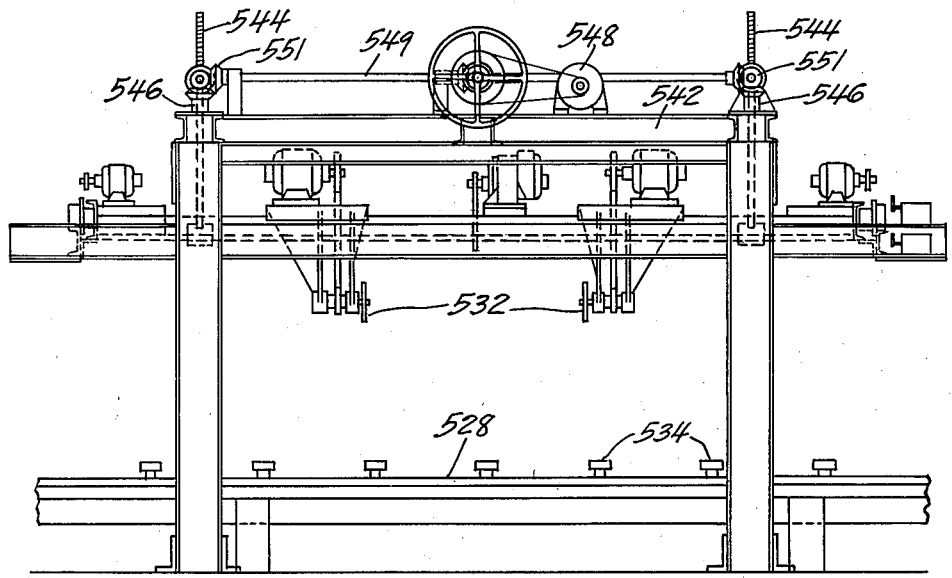
Fig. 48 is a side elevation of one form of mechanism for forming transversely extending cuts in wallboard as employed in the construction of Figs. 38 and 39.

It is desirable to provide means for controlling the operation of the fastener applying devices so as to avoid the discharge of fasteners and the operation of devices which are located over openings in the framework or in other areas wherein there are no timbers present. Therefore each fastener applying device is provided with its own control means which serves to detect the presence of a timber in position to receive a fastener and thereby render the fastener applying device operative or inoperative depending upon whether there is a timber located beneath the device or not. The form of control means illustrated is shown in Figs. 46 and 47 and includes a rod 508 which is urged downward by means of a spring 510 so that the lower end of the rod 508 normally projects below the press member 488 as shown in Figs. 44 and 46. The arm 512 of a bell crank is connected to the rod 508 and the opposite arm 514 of the bell crank is connected to a link 516 which carries a pivoted arm 518 having a block 520 on the end thereof. The block 520 is movable into and out of position between the upper head 522 of the plunger 506 and the cross-head 476.

With this construction upon downward movement of the press member 488 the lower end of each rod 508 is moved into engagement with the timber located beneath the press member. Continued downward movement of the press member causes the rod 508 to be raised against the action of the spring 510 so that the arm 512 of the bell crank is raised and arm 514 is moved transversely to shift the block 520 from the idle position shown in Fig. 46 in which the block is removed from beneath the cross head 476 to the active position shown in Fig. 47 wherein the block 520 is located beneath the cross-head 476 and above the head 522 of the plunger 506 by which the fastening elements are formed and driven into the timbers of the framework. Downward movement of the cross-head 476 when the block 520 is in the active position of Fig. 47 causes the cross-head to engage the block 520 and to force it downward against the head of the plunger 506. Downward movement of the plunger causes it to strike off a portion of the strip material in the chamber 504 and form the fastening element and drive it into the upper face of the timber beneath the fastener applying device.

In the event there is a door or window opening beneath any fastener applying device, the rod 508 associated with that device and projecting below the press member 488 will move into an empty space and therefore will not be raised. Under such circumstances the bell crank arms 512 and 514 of that particular fastener applying device will not be rocked and the block 520 will remain in the idle position shown in Fig. 46. Downward movement of the cross-head 476 then will be insufficient to engage and operate the plunger 506 so that that fastener applying device will remain inoperative whereas those fastener applying devices which are positioned over timbers will be actuated to drive fastening elements into the timbers.

This selective operation of the fastener applying devices is wholly automatic and assumes the application of fastening elements to the timbers without discharging and wasting fastening elements which might accumulate and interfere with the operation of the machine.

The means for actuating the motor which drives the eccentric 482 may be a manually operated switch, although as shown in Fig. 43 I prefer to employ a switch such as that shown at 524 which is actuated by movement of a vertical timber of the framework into position beneath the stapling and fastener applying device. In this way the mechanism is made wholly automatic and serves to apply the staples 472 for securing the timbers together and the fastening elements 474 to the upper face of the timbers in a single operation which may be carried out rapidly and accurately with a minimum of supervision. The switch 524 preferably also controls the circuit for causing the carriage 414 to be advanced upon completion of each operation of the stapling and fastener applying device so that the carriage will be moved automatically and one step at a time through station 402 and all operations are performed at that station without supervision.

From station 402 the carriage 414, carrying the framework of the section is advanced to the station 404 where sheet material, wallboard or the like is applied to the upper face of the framework over the fastening elements 474. The sheet material may be applied by hand or by suitable means such as that illustrated and described in Figs. 17 to 22. It will also be apparent that glue may be applied to the timbers of the framework at station 404 if desired and the glue may be applied by hand or by mechanism such as that shown in Figs. 17 to 20.

After the sheet material is applied to the framework the assembly is passed to the press 526 at station 406. The press employed may be of any suitable type, such as that illustrated in Figs. 24 to 26 of the drawings, and serves to force the wallboard or sheet material downward onto the timbers of the framework whereby the upwardly projecting prongs of the fastening elements are driven or forced into the sheet material. By thus securing the sheet material to the timbers by means located adjacent the timbers the exposed face of the wallboard is unmarred and free from exposed securing elements. Such "blind" fastening of the wallboard is of advantage in that the exposed face of the section may be painted or papered without patching or filling holes or dents in the wallboard and without applying any means to the wallboard to cover or conceal the heads of nails or other fasteners.

In the preferred operation, during pressing of the sheet material onto the fastening elements of the framework, the stationary end guide 438 is removed from the carriage 414 and the movable end guide 440 and cross frame 442 are moved longitudinally of the carriage by motor 456 and chains 444 while the carriage itself is held stationary by the chains 460. In this way the section consisting of the framework and sheet material is moved lengthwise of the bed of the carriage and is discharged from the carriage upon completion of the pressing operation. The supports or tracks 528 at the cutting station 408 are located in alignment with the bed 412 of the carriage 414 to receive the section discharged from the carriage during the pressing operation so that upon completion of the pressing operation the carriage is empty and free to be moved back to its initial position at station 400 of Figs. 37 and 38 whereby the framework of another section may be assembled and produced on the carriage while the previously assembled framework and sheet material is undergoing further operations. On return of the carriage 414 to its initial loading position the cross frame 442 and movable end guide 440 are returned to the left hand end of the bed 412 to clear the bed for assembly of the timbers in producing another section frame.

The supports 528 of the cutting station 408 extend longitudinally of the machine beneath the cutters 530 which are arranged for forming longitudinal cuts in the sheet material and the cutters 532 which are arranged to form vertical cuts in the sheet material. The section is guided in its movement along the supports by the members 534 which are located adjacent the edges of the supports 528. The section is moved along the supports 528 by the conveyor chains 536 which are driven by a motor (not shown) for advancing the section removed from the carriage 414.

The type of cutters and cutter operating means employed at station 408 may be the same or similar to those shown in Figs. 27 to 33 of the drawings. However, in order to illustrate a modified form of cutter actuating means the construction shown in Fig. 43 is illustrated as embodying a frame 542 which is vertically movable by means of the threaded shafts 544 located at each corner of the frame. These shafts extend through the threaded bearings 546 on the frame 542 and are driven by the motor 548 through shaft 549 and bevelled gears 551. The threaded shafts 544 are located in the corners of the frame 542 and are operable to raise and lower the frame while holding the frame in a horizontal position. The saws 530 and 532 on the frame are thus moved vertically into and out of engagement with the sheet material of the section being fabricated. The saws themselves are movable on the frame 542 to form cuts in the sheet material in any desired locations for forming door and window openings or other openings in the sheet material and their movement and operation may be controlled manually or by suitable means such as those described in connection with the first embodiment of my invention set forth above.

The section leaving the station 408 is finished with wallboard on one face only and is delivered to the clearing station 410 from which it may be removed for erection with other sections in forming a building. However, when the section is to have wallboard or sheet material applied to both faces of the framework, the section is inverted and returned to the assembly station 400 where it is again placed on the carriage 414 with the previously applied wallboard located adjacent the bed 412 of the carriage and the exposed timbers facing upward. The section is then passed a second time through the stapling and fastener applying device at station 402 whereby staples and fastener elements are applied to the upwardly facing surfaces of the section framework. Wallboard is then applied over the fastening elements and the structure is passed to the press and cutters as before to secure and finish the wallboard on the opposite face of the section. The completed section when delivered a second time to the clearing station 410 needs no further operations for completion although the wallboard or sheet material may be painted or have wall paper applied thereto before it is assembled with other sections in the erection of a building if desired.

Although the material applied to the framework has been referred to as wallboard or sheet material, any other suitable form of a covering, siding, shingles, or the like may be applied to the framework and this may be accomplished without material change in the mechanism described by the use of preassembled siding, clapboard, shingles or other covering material.

Further, when forming building sections such as floor or ceiling sections, the timbers employed are joists and headers, but the method and mechanism used in assembling the frame of the section and in applying flooring or ceiling material to the frame may be substantially the same as that described above. Little or no modification is required to secure roofing or floor sections to the assembled frame, particularly if the flooring is pre-assembled on a base of wallboard or similar material capable of being held in place by fastening elements, glue or other means carried by the joists, rafters or other timbers of the section.

Figure 49:
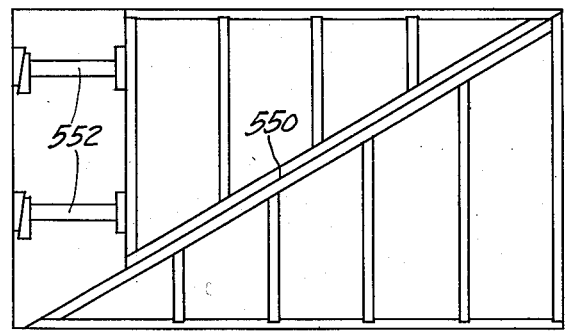
Fig. 49 is a diagrammatic plan view of building sections constructed in accordance with my invention.

The present invention, and particularly that form thereof illustrated in Figs. 38 to 48, renders it possible to produce two or more related or similar sections simultaneously. Thus when constructing gable end sections or other structures embodying inclined timbers the framework for two sections may be assembled on the bed of the carriage, as shown diagrammatically in Fig. 49. A single sheet of wallboard or the like may then be secured to the assembly of section and the sections may thereafter be cut apart along the line 550 to produce two separate sections. Further, when forming building sections with inclined timbers or gables, suitable blocks or supports such as those shown at 552 in Fig. 49 may be assembled with the timbers at the assembly station and after the timbers have been clamped together and secured by nailing or otherwise these blocks or supports may be removed from the section and used on succeeding sections while the first section travels to other stations in the machine.

While I have illustrated and described two particular forms of mechanism adapted for use in fabricating building sections in accordance with my invention it will be apparent that the same or similar mechanism may be employed for fabricating other types of structures and that the invention has particular utility when the successive structures to be produced are not uniform in size, shape or other respects. It also will be apparent that other forms of presses, nailers, cutters, control means, and similar mechanism may be substituted for those shown and described and the mechanism provided at the various stations in the machine may be arranged in various orders, or some stations may be eliminated or rendered temporarily inoperative when not required for the fabrication of a particular structure. In view thereof, it should be understood that the specific forms of the invention and methods of procedure herein shown and described are intended to be illustrative only and are not intended to limit the scope of my invention.

I claim:

1. Mechanism for fabricating building sections comprising a series of stations, means at one of said stations for securing timbers together in predetermined positions to form a framework for said section, means for moving the resulting framework successively past other stations in said series, operating means at any of said other stations for applying sheet securing means to said timbers and at a subsequent one of said other stations for applying sheet material to said sheet securing means, and actuating means at each of said other stations positioned to be engaged and actuated by a timber of said framework for controlling said operating means.

2. Mechanism for fabricating building sections which embody a framework formed of timbers having sheet material applied thereto, comprising means for holding said timbers in predetermined positions for forming said framework, means for applying fastening means to timbers thus held in predetermined positions to secure the timbers together and in positions to be engaged by sheet material to be applied to the framework, and means for pressing sheet material applied to said framework against the fastening means which are in positions to secure said sheet material to said framework.

3. In mechanism for fabricating building sections having a framework formed of timbers, means for driving fastening elements into said timbers comprising a support for the timbers, a plurality of driving devices located adjacent timbers on said support in position to operate upon said timbers, means movable toward and away from said support to actuate said driving devices, and control elements movable with said means and engageable with said timbers for rendering said devices operative.

4. In a mechanism for fabricating building sections having a framework formed of timbers, means for applying fastening elements to said timbers comprising a support for the timbers, a plurality of driving devices located adjacent said support in position to operate upon said timbers, control means movable toward and away from timbers on said support to actuate said driving devices, and control elements engageable with said timbers, said control elements being movable relative to said control means and driving devices on movement of said control means toward said timbers to render said driving devices operative only when a timber is positioned to receive a fastening element.

5. In mechanism for fabricating building sections having a framework formed of timbers, means for applying fastening elements to said timbers comprising a support for the timbers, a plurality of driving devices located above said support in position to operate upon said timbers, control means movable toward and away from said support to actuate said driving devices, and control elements projecting below said control means and engageable with said timbers, said control elements being movable relative to said control means and driving devices to render said driving devices operative only when a timber is positioned to receive a fastening element.

6. Mechanism for fabricating building sections comprising a carriage, means on said carriage movable relative thereto for clamping timbers together to form a framework for a building section, a track along which said carriage and clamped timbers are movable, means located adjacent said track for securing said timbers together, and means positioned to be actuated by a timber of the framework on said carriage controlling operation of said timber securing means.

7. Mechanism for fabricating building sections comprising a carriage, means on said carriage movable relative thereto for clamping timbers together to form a framework for a building section, a track along which said carriage and clamped timbers are movable, means located adjacent said track for securing said timbers together, and means engageable with timbers on said support controlling operation of said timber securing means.

8. Mechanism for fabricating a building section comprising a carriage with means thereon for holding timbers in position to form a framework for said section, means for securing said timbers together, means for moving said carriage in successive steps past said timber securing means with an interval of rest between said steps, and means positioned to be actuated by a timber adjacent said timber securing means for controlling the operation thereof.

9. Mechanism for fabricating a building section comprising a carriage with means thereon for holding timbers in position to form a framework for said section, means for securing said timbers together, means for moving said carriage and timber holding means in successive steps past said timber securing means with an interval of rest between said steps, and means engageable by said timbers for controlling operation of said timber securing means.

10. Mechanism for fabricating a building section comprising a carriage having clamping means thereon for holding timbers in place for forming a framework for said section, means for applying fastening elements to said timbers to secure the timbers together, a press for forcing sheet material into contact with the timbers of said framework, and means for moving said carriage and positioning a framework thereon with respect to said applying means and press while holding said framework together.

11. In mechanism for fabricating building sections, a carriage having a bed, abutment means movable into and out of an operative position in which the abutment means projects above said bed, a member movable over said bed and toward said abutment means for clamping timbers together in positions to form a framework for a building section, means for driving fastening means into said timbers to secure them together in forming a framework, a track along which said carriage is movable to bring successive timbers of the framework into position adjacent said fastener driving means, and means for moving said member across said bed to discharge a completed framework from said bed on movement of said abutment means to an inoperative position.

12. Mechanism for fabricating building sections, comprising a series of stations, a carriage movable from one of said stations to another and provided with a timber supporting bed, abutment means movable into and out of an operative position adjacent one end of the bed and in which the abutment means projects above said bed, a member movable over said bed and toward said abutment means when said abutment means is in its projecting position for clamping timbers together in positions to form a framework for a building section, means for moving said carriage with the timbers clamped in position thereon from one of said stations to another, operating means at said stations for performing successive operations on said framework, and means for moving said member across said bed to discharge a completed framework from said bed on movement of said abutment means to an inoperative position.

13. Mechanism for successivly fabricating a variety of building sections comprising a series of stations, means at one of said stations for securing timbers together in selected predetermined positions to form a selected type of framework for a section, means for moving the resulting framework successively past one after another of the other stations in said series, means at said other stations for performing other operations on said sections and independently operable control means at each of said other stations positioned to be actuated by timbers of said framework on movement of said framework to said other stations for actuating the operation performing means at said other stations.

CHARLES J. BAMFORD, Sr.

REFERENCES CITED

The following references are of record in the file of this patent:

UNITED STATES PATENTS

| Number | Name | Date |
|---|---|---|
| 819,471 | Theuret | May 1, 1906 |
| 1,041,987 | Engberg | Oct. 22, 1912 |
| 1,599,214 | Craig | Sept. 7, 1926 |
| 1,639,674 | Shellanberger | Aug. 23, 1927 |
| 1,663,535 | Brandau | Mar. 20, 1928 |
| 1,722,952 | Bergstein | July 30, 1929 |
| 1,799,958 | Cranston | Apr. 7, 1931 |
| 1,859,633 | Rhinevault | May 24, 1932 |
| 1,909,451 | Breece | May 16, 1933 |
| 1,909,510 | Welch | May 16, 1933 |
| 2,262,827 | Wilson, Jr. et al. | Nov. 18, 1941 |
| 2,281,402 | Wilson | Apr. 28, 1942 |
| 2,302,961 | Kramer | Nov. 24, 1942 |
| 2,318,695 | Klammt et al. | May 11, 1943 |
| 2,370,932 | Bolling | Mar. 6, 1945 |
| 2,378,948 | Paxton | June 26, 1945 |